(12) United States Patent
Soracco et al.

(10) Patent No.: US 9,545,549 B2
(45) Date of Patent: Jan. 17, 2017

(54) GOLF BAG WITH A DOCKING STATION FOR AN ELECTRONIC DEVICE

(71) Applicant: Cobra Golf Incorporated, Carlsbad, CA (US)

(72) Inventors: Peter L. Soracco, Carlsbad, CA (US); Ryan L. Roach, Carlsbad, CA (US)

(73) Assignee: Cobra Golf Incorporated, Carlsbad, CA (US)

( * ) Notice: Subject to any disclaimer, the term of this patent is extended or adjusted under 35 U.S.C. 154(b) by 218 days.

(21) Appl. No.: 14/256,423

(22) Filed: Apr. 18, 2014

(65) Prior Publication Data

US 2014/0339110 A1  Nov. 20, 2014

Related U.S. Application Data

(60) Provisional application No. 61/823,634, filed on May 15, 2013.

(51) Int. Cl.
| | | |
|---|---|---|
| G08B 13/14 | (2006.01) |
| A63B 55/00 | (2015.01) |
| A63B 71/06 | (2006.01) |
| G01S 19/19 | (2010.01) |
| H02J 7/00 | (2006.01) |

(52) U.S. Cl.
CPC ............ *A63B 55/008* (2013.01); *A63B 55/00* (2013.01); *A63B 55/408* (2015.10); *A63B 71/0619* (2013.01); *G01S 19/19* (2013.01); *H02J 7/00* (2013.01); *A63B 2071/0658* (2013.01); *A63B 2071/0694* (2013.01); *A63B 2220/12* (2013.01); *A63B 2220/72* (2013.01); *A63B 2225/20* (2013.01); *A63B 2225/50* (2013.01); *A63B 2225/54* (2013.01)

(58) Field of Classification Search
None
See application file for complete search history.

(56) References Cited

U.S. PATENT DOCUMENTS

| | | | |
|---|---|---|---|
| 4,042,765 | A | 8/1977 | Floyd et al. |
| 4,642,250 | A | 2/1987 | Spector |
| 4,681,791 | A | 7/1987 | Shibahashi et al. |
| 4,840,371 | A | 6/1989 | Harris |
| 4,918,758 | A | 4/1990 | Rendina |
| 5,279,682 | A | 1/1994 | Wald et al. |
| 5,479,325 | A | 12/1995 | Chien |
| 5,843,548 | A | 12/1998 | Sanders |
| 5,852,829 | A | 12/1998 | Relaford |
| 6,073,086 | A | 6/2000 | Marinelli |
| 6,116,745 | A | 9/2000 | Yei |
| 6,202,335 | B1 | 3/2001 | Shelton et al. |

(Continued)

OTHER PUBLICATIONS

Belding Golf Bags, Belding Golf Bag Showroom, 2011, http://beldinggolfbags.com/showroom/index.php?level=picture&id=1539.*

(Continued)

*Primary Examiner* — Jason Yen
(74) *Attorney, Agent, or Firm* — Brown Rudnick LLP; Mark S. Leonardo

(57) ABSTRACT

The invention generally relates to golf bags. A golf bag of the invention may include a detachable and re-attachable storage compartments. A golf bag may include retractable straps. A golf bag of the invention may include power collection and power plug-in devices.

14 Claims, 24 Drawing Sheets

(56) References Cited

U.S. PATENT DOCUMENTS

| | | |
|---|---|---|
| 6,231,233 B1 | 5/2001 | Orce |
| 6,311,332 B1 | 11/2001 | Lien |
| 6,330,427 B1 | 12/2001 | Tabachnik |
| 6,366,205 B1 * | 4/2002 | Sutphen ............. G08B 21/0227 340/568.1 |
| 6,880,364 B1 | 4/2005 | Vidolin et al. |
| 7,205,894 B1 * | 4/2007 | Savage ................. A63B 55/00 340/539.32 |
| 7,311,612 B2 | 12/2007 | DeLucia |
| 8,120,132 B2 | 2/2012 | Guha et al. |
| 2003/0149496 A1 * | 8/2003 | Johnson ............. A63B 24/0021 700/91 |
| 2003/0172430 A1 | 9/2003 | Jarrett |
| 2004/0026280 A1 | 2/2004 | Herold |
| 2004/0142766 A1 * | 7/2004 | Savarese ........... A63B 24/0021 473/353 |
| 2004/0194363 A1 | 10/2004 | Wagenknecht et al. |
| 2005/0178037 A1 | 8/2005 | Kunreuther |
| 2006/0113203 A1 * | 6/2006 | Daley ..................... A45C 5/02 206/320 |
| 2006/0147708 A1 | 7/2006 | Clark |
| 2007/0054594 A1 | 3/2007 | Schmidt et al. |
| 2007/0252115 A1 | 11/2007 | Arehart et al. |
| 2008/0024298 A1 * | 1/2008 | Keays ................ G08B 13/1427 340/568.6 |
| 2008/0084686 A1 | 4/2008 | Gutsch et al. |
| 2009/0046760 A1 | 2/2009 | Matheson |
| 2009/0237245 A1 * | 9/2009 | Brinton .................. G07C 5/008 340/540 |
| 2010/0000602 A1 | 1/2010 | Gray et al. |
| 2010/0232143 A1 | 9/2010 | Burrows et al. |
| 2010/0248852 A1 | 9/2010 | Lee |
| 2010/0313334 A1 | 12/2010 | Moy |
| 2011/0025195 A1 | 2/2011 | Govender |
| 2011/0028230 A1 | 2/2011 | Balardeta et al. |
| 2011/0088143 A1 | 4/2011 | Lee |
| 2012/0052971 A1 | 3/2012 | Bentley |
| 2012/0113285 A1 * | 5/2012 | Baker ................ H04N 1/00127 348/222.1 |
| 2012/0262116 A1 * | 10/2012 | Ferber .................. H02J 7/0044 320/111 |
| 2012/0316843 A1 | 12/2012 | Beno et al. |
| 2013/0166405 A1 | 6/2013 | Mitzel et al. |
| 2013/0217448 A1 | 8/2013 | Kim et al. |
| 2013/0233378 A1 | 9/2013 | Moslehi et al. |

OTHER PUBLICATIONS

Daniel P., Charge your phone by walking—reverse electrowetting shows promising results, Aug. 26, 2011, http://www.phonearena.com/news/Charge-your-phone-by-walking--reverse-electrowetting-shows-promising-results_id21568.*

* cited by examiner

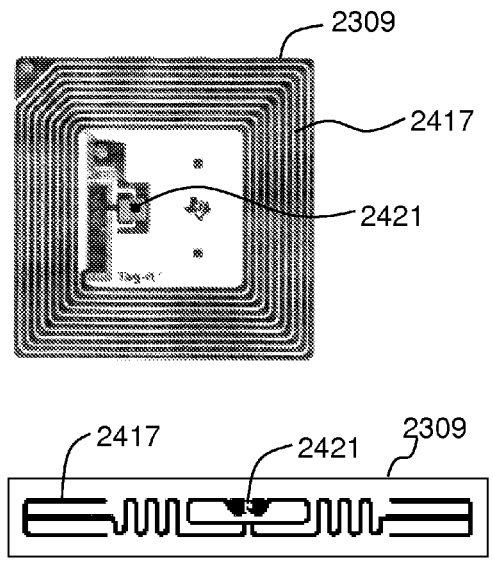
FIG. 24
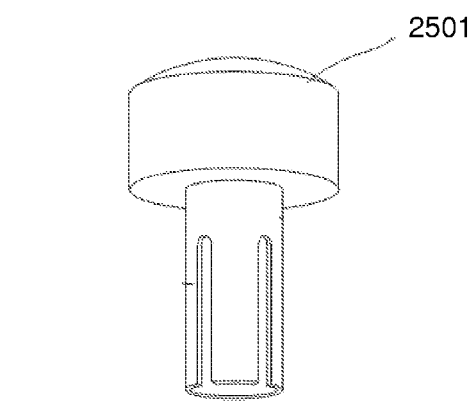
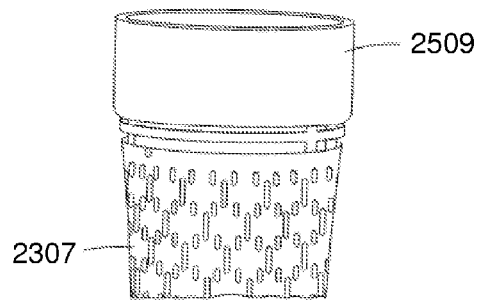
FIG. 25

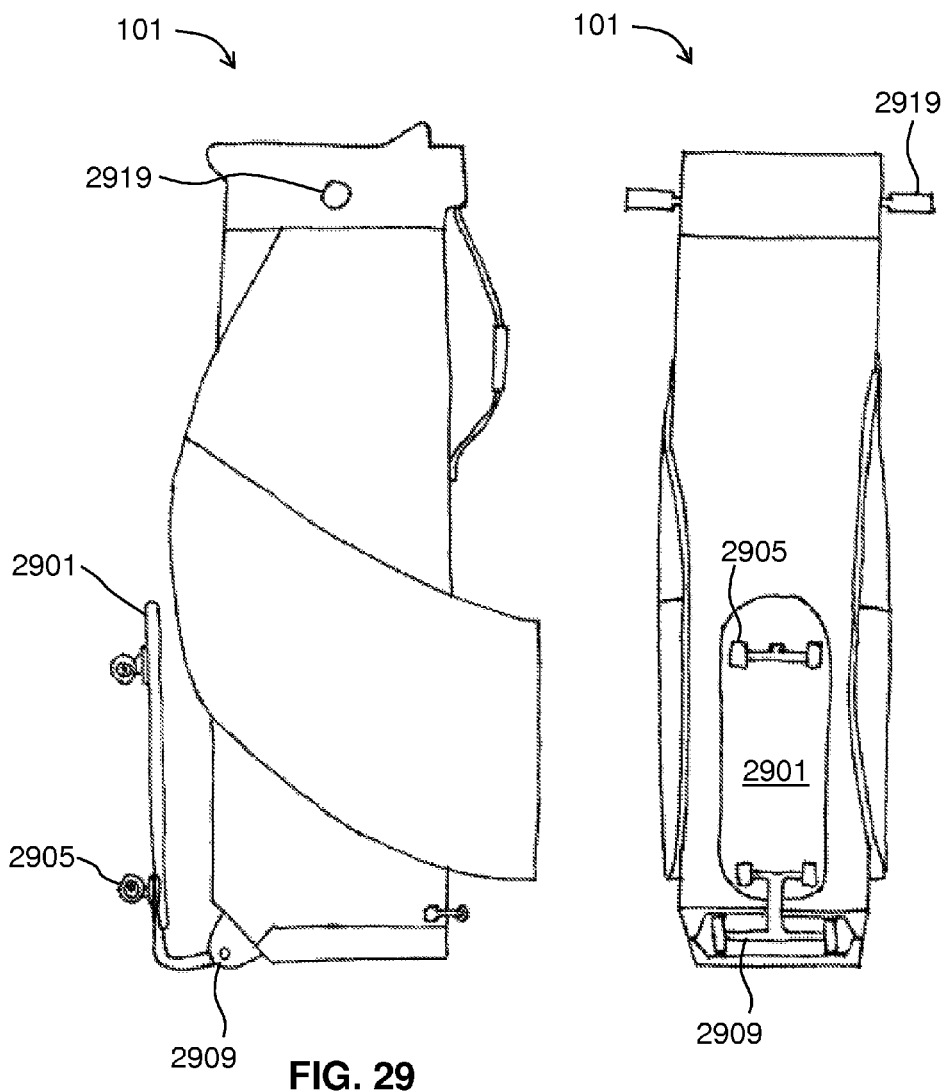

GOLF BAG WITH A DOCKING STATION FOR AN ELECTRONIC DEVICE

CROSS-REFERENCE

This application claims the benefit of, and priority to, U.S. Provisional Patent Application Ser. No. 61/823,634, filed May 15, 2013, the contents of which are incorporated by reference.

FIELD OF THE INVENTION

The invention generally relates to golf bags.

BACKGROUND

Golf is one of the few ball sports that does not require a standardized playing area. Numerous different golf courses have been created around the globe over the centuries. Millions of people have played the sport on those countless differing golf courses. One persistent theme throughout is that people must carry golf clubs, balls, and other gear from hole to hole. Many people derive great joy from so going on foot, carrying their gear in a golf bag.

Another theme—in problematic tension with the first—is the great diversity of golfers and courses. Just as no two days are alike, just as no two golf courses alike, nor are any two golfers alike. Just as one player may be a gadget enthusiast, bringing the latest smartphone apps out to play, another player may be a purist, requiring and desiring nothing more than fourteen clubs and a towel. Golf bags may do a fair job of holding clubs but, beyond that, any given bag is typically a take-it-or-leave-it proposition. A golfer who wants to carry a six-pack must bring a cooler. When rain threatens, a golfer may want a bag with plenty of stowage for a jacket and umbrella. But on a clear day, that same bag is too bulky. The golf bags that are available do not meet the diversity of people and needs that arises across the globe every day.

SUMMARY

The invention provides a golf bag that includes an electronic device to provide information benefits to a golfer. An electronic device on the golf bag preferably includes a processor coupled to a non-transitory memory, a docking station for a mobile device, or both. The golf bag may provide information via a speaker, screen, a golfer's smartphone, or such and aid a golfer in the benefit they get from the game. For example, an electronic device on a golf bag may execute a program to aid in club selection, detecting the use of certain clubs, golf tips, provision of weather or course information, or maintaining contact with acquaintances not presently also on the same golf course. A golf bag is a natural place for golfers to congregate while on the course, an electronic device can provide a group with valuable information: scores; videos of pros making shots; etc. Since an electronic device on a golf bag may include a docking station for a personal device (e.g., smartphone or tablet computer), a golfer may plug in their device to charge it, it to transfer data from on-bag device to the personal device. (E.g., where the bag device is used for scorekeeping, data can be transferred to personal device for later review). A golf bag's size makes it an excellent place for energy management device and can even improve the usefulness of a personal device out on a golf course. A golf bag can include a chargeable battery, an energy collection device, or both. This way, one or a number of different golfers can charge their devices using the bag while out on the golf course. As more golf apps become available for personal devices, the ability to charge those devices out on the course will become more and more beneficial.

The invention provides a golf bag that may include other features. By including one or more features of the invention on a golf bag, any given player can have a golf bag that is customized to their preferences and style and even to the course as well as to the day. Embodiments of the invention include a golf bag with features that can be customized by a user such as interchangeable pockets or reconfigurable electronic options. Additionally, a golf bag of the invention may include features that provide great benefits in comfort or usefulness such as retractable straps or wheels. The invention also provides golf bags with a low ecological impact through the inclusion of "earth-friendly" materials and techniques. The invention includes improved integration of gear into a golf bag in the form of integrated parts such as score card holders or head covers.

In certain aspects, the invention provides golf bag that has an extended body with a closed end, an open end, a top surface area, a bottom surface area, a right side surface area, and a left side surface area and at least one storage compartment.

The bag may include a stand system with at least one support leg and at least one leg stay (preferably at least two legs). The bag may have a top handle, an end handle, or both. Preferably, the bag has one or a combination of additional features such as a telescoping shaft to act as laser range finder tripod, a docking station for an electronic device, a reinforcing pad, a soft gear storage compartment, an insulated ball warmer pocket dimensioned to receive a plurality of golf balls, a hard bottom that defines a hard-shell storage compartment, a scorecard pocket, a pocket dimensioned to receive a 12 ounce can or a bottle, wheels, a pencil holder, an integrated driver head cover, or a rain poncho. The scorecard pocket may have a flap (e.g., with a hook-and-loop fastener closure) and a slot for inserting a card.

An included rain poncho can be dimensioned to cover a plurality of golf clubs stored within the golf bag, dimensioned to be removed from the golf bag and worn by a human, or both can be included.

Other features can include an energy collection device such as a photovoltaic cell, a reverse electrowetting electricity generator, or a pluggable connection point.

In some embodiments, the bag includes at least one matching headcover.

In some embodiments, the extended body comprises a fabric that includes recycled material. Recycled material may be included that is made from discarded plastic.

In some aspects, the invention provides a golf bag with removable components. The bag may include at least one attachment tag. In some embodiments, the at least one attachment tag comprises part of a hook-and-loop fastener system. In some embodiments, the attachment tag comprises a mounting track configured to interlock with a complementing mounting track. In some embodiments, the storage compartment is held in place by an attachment tag and can be manually removed and re-coupled. In certain aspects, the invention provides golf bag having a plurality of pockets, in which each pocket comprises an attachment mechanism and is detachable and re-attachable to the golf bag. The attachment mechanism could include: a mounting track permanently affixed to a surface of the bag and a mating coupling on each pocket; a hook and loop fastener; grommets; plastic fasteners; others; or a combination thereof.

In certain aspects, the invention provides golf bag having an extended body with a closed end, an open end, a top surface area, a bottom surface area, a right side surface area, and a left side surface area and a retractable strap system comprising one or more retractable straps. In certain aspects, the invention provides a golf bag with automatically retracting straps.

In some embodiments, the retractable strap system comprises a tensioner to snug the retractable straps against the extended body. The retractable strap system may include a five-point buckle. In certain embodiments, the retractable strap system is dimensioned to position a center of a gravity of the bag, when loaded and worn, in a plane that bisects the wearer and contains a center of gravity of the wearer.

A retractable strap system may use at least one recess in a surface of the extended body dimensioned to receive the one or more retractable straps.

In certain aspects, the invention provides golf bag in which at least one internal divider uses a graphite shaft salvaged from a previously-used golf club.

BRIEF DESCRIPTION OF THE DRAWINGS

FIG. 24 shows radio frequency identification (RFID) tags.
FIG. 25 shows a grip with housing.
FIG. 29 shows a bag having a wheeled conveyance.
FIG. 30 gives a front view of a wheeled conveyance

DETAILED DESCRIPTION

The invention provides systems and methods by which golfers may carry their clubs during golf and also conveniently give themselves access to useful features and accessories that can enhance the enjoyment of golf or be used to improve players' golfing ability. An important insight of the invention is that golfers' experiences may be enhanced through the use of several small accessories and that a golf bag is a convenient place to collect and provide those. Another important insight is that the proliferation of digital enhancements to golf requires an on-course "home base" that serves as central point for information services and that also provides modular, versatile storage and connection points.

Figure 1:
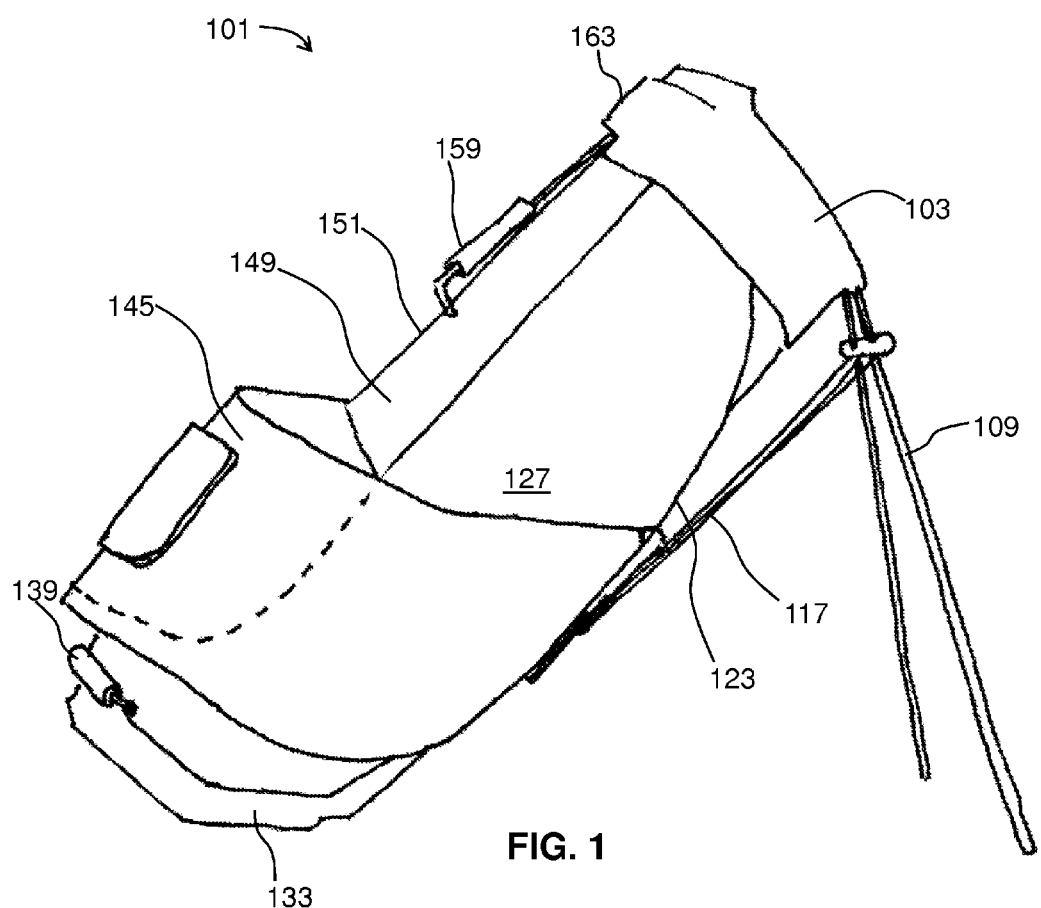
FIG. 1 shows a golf bag of the invention.

FIG. 1 shows a golf bag 101 that includes an extended body having a closed end 133, an open end 103, a top surface portion 149, a bottom surface portion 123, a right side surface portion 127, and a left side surface portion 151. At least one storage compartment 145 is included for storing equipment.

Golf bag 101 may include a compartmentalized area 163 wherein part of an outer surface of the bag forms a wall-like structure that encloses mechanisms and features of bag 101. For example, compartment 163 may be defined, wholly or in part, by a hard plastic shell extending from a surface of bag 101. Compartment 163 maybe within a surface of bag 101. Compartment 163 may be defined by walls formed of sturdy fabric (e.g., ripstop nylon, leather, other material). Various structural elements (such as a mount-point for handle 159) may be housed within compartment 163.

Golf bag 101 may be any type of golf bag, or may have a style that defies existing classifications. Golf bag 101 may be a walking bag (aka carry bag), staff bag, or cart bag. In certain embodiments, golf bag 101 may be classified as a walking bag, in that it is designed to be lightweight for ease of carrying. As a walking bag, golf bag 101 may include a light material such as plastic or nylon. As a walking bag, golf bag 101 hold at least a basic set of clubs, as well as tees and balls. Golf bag 101 could alternatively be styled as a staff bag, also sometimes refered to as a tour bag. As a staff bag, golf bag 101 could be designed to hold an entire set of 14 golf clubs as well as all the accessories a golfer could possibly need. Staff bag golf bag 101 could include a sturdy, attractive material such as leather. In related embodiments, golf bag 101 may be constructed as a cart bag, e.g., mid-weight—lighter than staff bags but heavier than carry bags—and designed with more storage areas than the typical carry bag for optimal organization. It will be appreciated at the distinction between bag types can be amorphous and a golf bag 101 may have qualities of more than one type, or may be of a novel or unusual style (e.g., for reasons relating to features described herein).

Golf bag 101 may include a stand system comprising at least one support leg 109 and at least one leg stay 117 (typically and preferably two of each are included, although some embodiments include three for added stability). Golf bag 101 may optionally include a top handle 159, and an end handle 139, both, others, a combination thereof, or none.

One or more of leg 109 may additionally provide or include additional functionality. In some embodiments, at least one of leg 109 is hollow to receive or store one or more alignment stick. Alignment sticks, particularly in at least pairs, are useful aids for golfers to improve their shots. Golf bag 101 may include one or a plurality of leg 109 (e.g., optionally telescoping) which may provide a convenient place to store an alignment stick. An alignment stick may be plastic, nylon, fiberglass, wood, metal, and may be flexible or rigid and may be fixed or be itself telescoping. An alignment stick may be retained within a leg 109 via press fit/friction, a cap on leg 109 (e.g., threaded or press-fit), a detent mechanism, cotter pin, etc.

In certain embodiments, golf bag 101 includes at least one tube-shaped sleeve along a surface of the bag dimensioned to hold an alignment stick. Such a sleeve pocket may additional be dimensioned such that an alignment stick protrudes out of the end of the pocket when stored therein. The protruding portion of the stick can then be used to hold head covers or other loose materials. In some embodiments, bag 101 includes two such sleeves, one dimensioned as just described, and the other dimensioned to hold and cover all or substantially all of an alignment stick (the long pocket for storing and transporting sticks when not in use, the short pocket for temporarily holding sticks out on the course, so that the protruding portion is easy to grasp and also provides a storage post for materials such as head covers). At least two pairs of such elongated, tube-shaped pockets (e.g., each open at one end and closed at the other) may be included. Thus in some embodiments, golf bag 101 will include four elongated pockets, two of a first length and two of a second length, as well as optionally two alignment sticks capable of being stored substantially completely within the longer pockets and partially within the smaller pockets.

Figure 2:
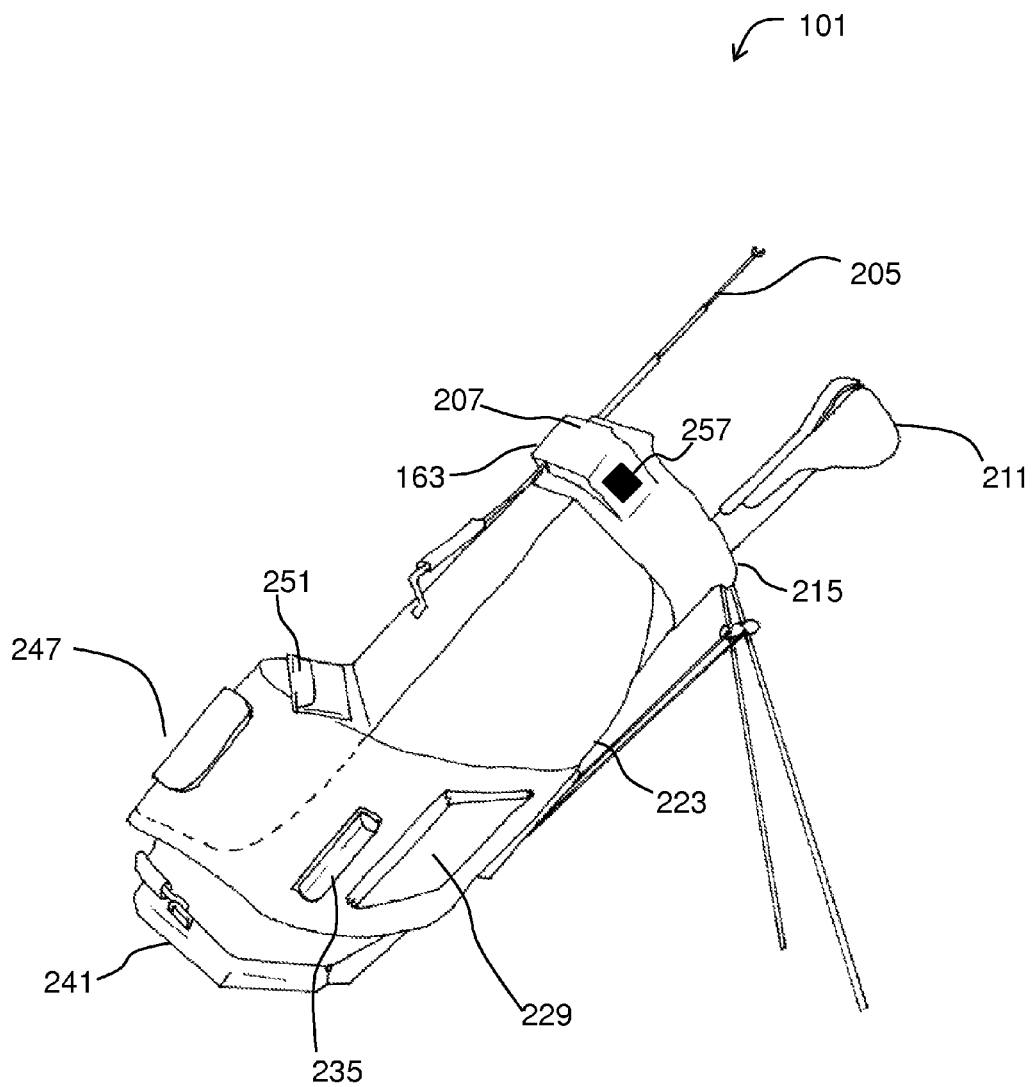
FIG. 2 shows a golf bag of some embodiments.

FIG. 2 shows a golf bag 101 according to certain embodiment to be an ultimate walking bag, featuring a preferred combination of features for a walking bag. Golf bag 101 preferably includes at least one or more of a telescoping shaft 205 to act as laser finder tripod, a docking station 207 for an electronic device, a reinforcing pad 223, a soft gear storage compartment 229, and an energy collection device 257. A docking station 207 may be housed wholly or partially by compartment 163. Energy collection device 257 may include a solar cell, i.e., a photovoltaic cell. Solar cell 257 preferably includes a semiconductor material and may be formed, for example, with a crystalline silicon wafer with a contact grid made from busbars and fingers. Materials suitable for cell 257 may be found discussed in U.S. Pat. No. 8,120,132 to Guha; U.S. Pat. No. 5,279,682 to Wald; U.S. Pub. 2010/0000602 to Gray; and U.S. Pub. 2013/0233378 to Moslehi, the contents of each of which are incorporated by reference. Energy collection device 257 may be connected via wires to a board 2861 within housing 163 and/or connected to docking station 207. Housing compartment 163 provides a good place for housing electronics and connections among electronic device such as energy collection device 257, docking station 207, or others.

Golf bag 101 may include an insulated ball warmer pocket 235 dimensioned to receive a plurality of golf balls. It has been found that warmer golf balls may perform better. Pocket 235 may be insulated to keep golf balls warm. In some embodiments, pocket 235 includes a heating element (e.g., attached to a battery or a photovoltaic cell on golf bag 101).

Golf bag 101 may include a hard bottom 241 that defines a hard-shell storage compartment. Hard bottom 241 may include an inner compartment member providing substantially a bottom enclosure to the bag and an outer lid member providing a base of the bag that rests on the ground. The lid and compartment may be hinged together in a clamshell design with a handle clasp, or may be separable. In some embodiments, the lid screws to the compartment member and appears—from the outside—to not be separable, and thus provides a hidden, or secret, storage compartment. Alternatively, the screw heads could be cosmetic, and the storage compartment could include concealed hinges and latch.

Preferably, hard bottom 241 provides a hard-shell storage compartment, e.g., that is non-deformable to protect its contents. The compartment may be dimensioned to receive a tablet computer or other delicate materials. In some embodiments, the compartment includes a protective insert (e.g., foam) with one or more cutaways dimensioned to house delicate items, such as a smartphone or computer device.

Golf bag 101 may include an integrated driver head cover 211, a repositionable score card pocket 251, an outer storage pocket 247, an expandable soft good storage pocket 229, or a combination thereof. Integrated cover 211 may include features substantially as described in U.S. Pub. 2013/0166405 to Mitzel. Cover 211 may be fixed to bag 101 (e.g., both made of a single piece of material, sewn on, or bonded by, for example, an adhesive). In some embodiments, cover 211 is removably attached (e.g., by Velcro, by grommet and carabiner, or plastic fasteners such as those sold under the trademark FASTEX).

Golf bag 101 may include a rain poncho compartment 207. It will be seen from FIG. 2 that a rain poncho may be stored in a compartment 207 that is disposed near the nape of the neck of golf bag 101. Compartment 207 may include a rain poncho that is dimensioned to cover a plurality of golf clubs stored within the golf bag. Compartment 207 could also store a poncho that is dimensioned to be removed from the golf bag and worn by a human. Golf bag 101 may include a club-covering poncho and a human-wearable poncho that match one another.

Figure 3:
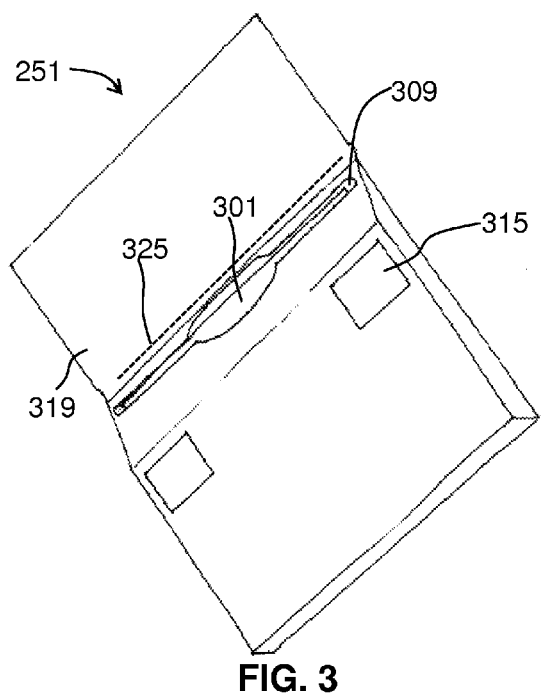
FIG. 3 depicts a card pocket.

FIG. 3 shows a scorecard pocket 251 that may be attached to golf bag 101. Scorecard pocket 251 may include a flap 319 extending away from a body of pocket 251 and connected through a crease 325 to facilitate easy closure. Preferably scorecard pocket 251 comprises a closure 315, which may include a hook-and-loop fastener such as VELCRO.

Scorecard pocket 251 generally includes a slot 309 with a widened notch opening, allowing for retrieval of a scorecard 301. Preferably, the notch exposes a substantially semicircular portion of a scorecard 301 stored therein.

Figure 4:
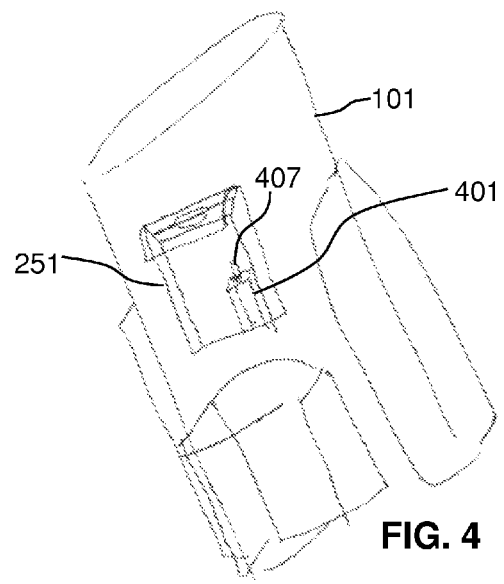
FIG. 4 illustrates a card pocket on a golf bag.

FIG. 4 shows a golf bag 101 with scorecard pocket 251 mounted thereon. Scorecard pocket 251 can be fixed in place (e.g., by sewing or adhesives) or can be removable (e.g., hook-and-loop fastening system or other). In some embodiments, as shown in FIG. 4, scorecard pocket 251 includes a pencil holder 401 for a pencil 407.

One insight of the invention is that it is desirable too have a golf bag 101 with a modular or interchangeable system of features such as pockets, storage, accessories, or other items. Features can be removably coupled to a golf bag by any suitable mechanism. In some embodiments, features are coupled via an attachment tag that operates by a mechanism such as a hook-and-loop fastener, snaps, a track-mounted fastening system, or others.

Figure 5:
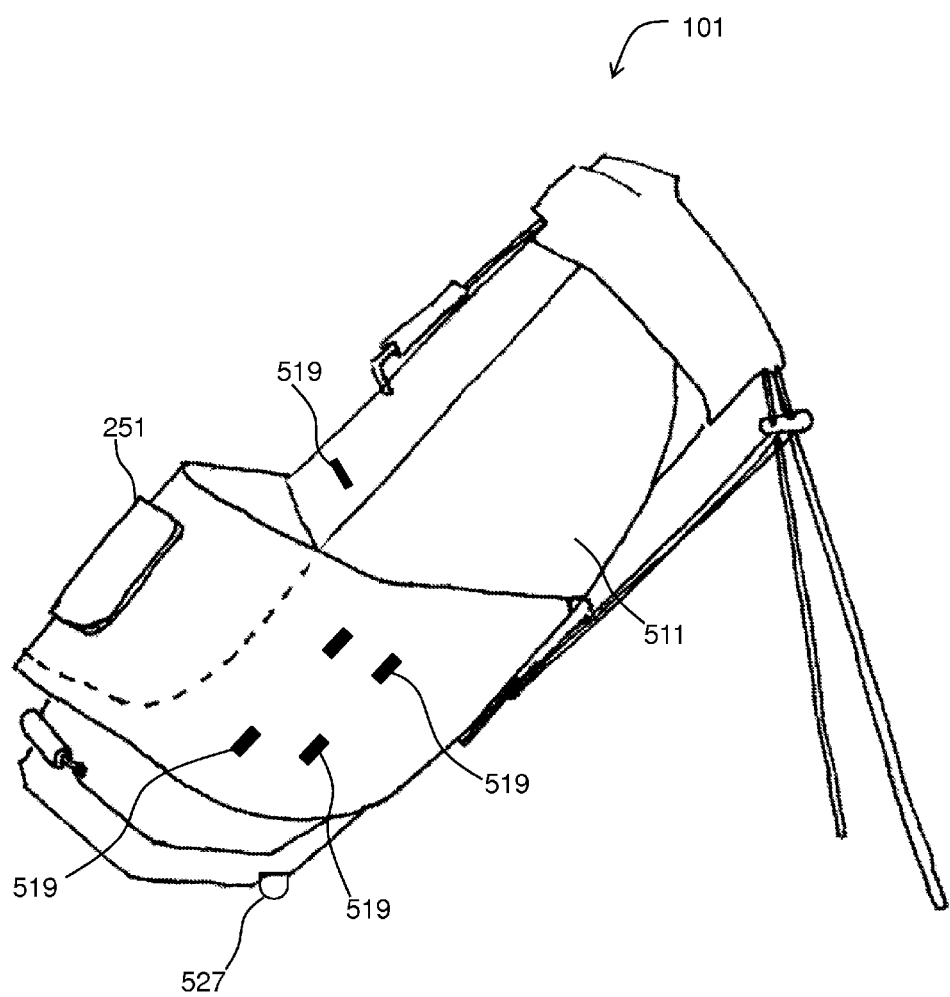
FIG. 5 reveals a system for interchangeable components.

FIG. 5 shows a golf bag 101 with a plurality of attachment tag 519. Each attachment tag 519 may optionally include a strip of hook-and-loop fastener. Golf bag 101 as shown in FIG. 5 also includes wheels 527, which may be retractable wheels. FIG. 5 depicts wheels 527 for rolling golf bag 101. Wheels 527 could be provided adjacent a non-rotating portion of bag 101 and disposed such that when bag 101 is leaned in one direction far enough the wheels engage the ground or floor surface, and when bag 101 is leaned less or not leaned, the non-rotating portion of bag 101 engages the ground or floor surface. In certain embodiments, wheels 527 are retractable (optionally, retract to be hidden). Retractable wheels 527 may be released to a usable position by an action of the golfer (e.g., pressing a button to release a spring that has been compressed against a ratchet when wheels 527 are retracted). In some embodiments, wheels 527 extend outward or increase in lateral displacement to create a wide base and inhibit golf bag 101 from tipping over. Some golfers may prefer retractable wheels 527 or engagable wheels 527 to obtain the benefit of ease of transport (e.g., between a car and a clubhouse) even when they do not plan to walk the entire course.

Figure 6:
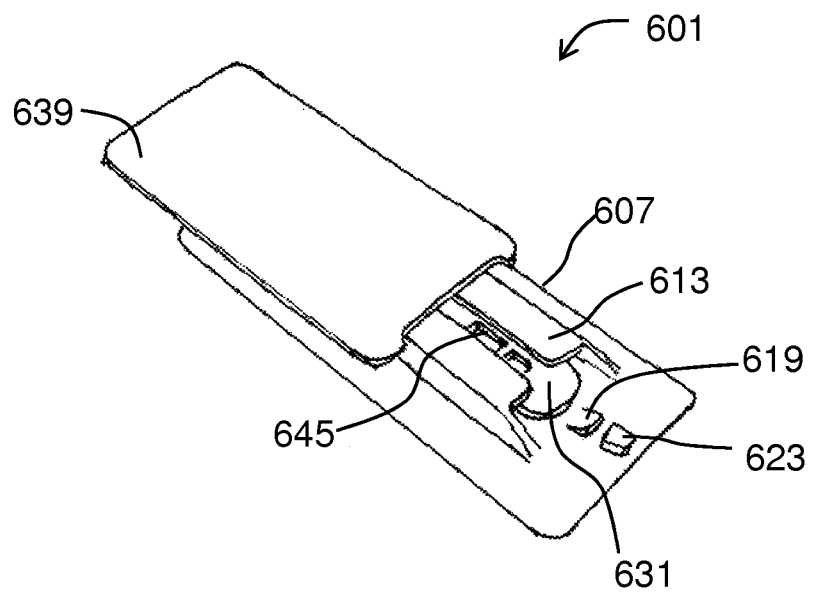
FIG. 6 shows a lockable mounting track.

FIG. 6 shows a track-style mounting assembly 601 for use as attachment tag 519. Assembly 601 includes a mounting track 607 configured to interlock with a complementing mounting track 639. Mounting track 607 includes enclosing rails 613 as well as ramp 619 and detent 623. Mounting track 639 includes a tongue 631 that fits within rails 613. Tongue 631 includes one or more of void 645 to receive detent 623. When assembled, assembly is released by lifting tongue 631 over detent 623.

Figure 7:
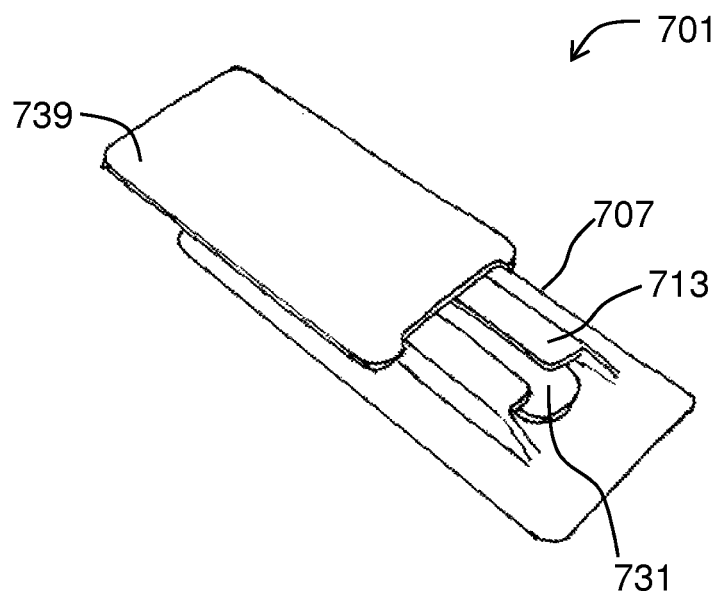
FIG. 7 shows a non-locking mounting tracks.

FIG. 7 shows a non-locking track-style mounting assembly 701 for use as attachment tag 519. A non-locking assembly 701 may be used where a user's hands will not be able to reach the assembled assembly. Assembly 701 includes mounting track 707 with rails 713 and mounting track 739 with tongue 731.

One or a number of assembly 601, assembly 701, or both can be used to mount components to bag 101.

Figure 8:
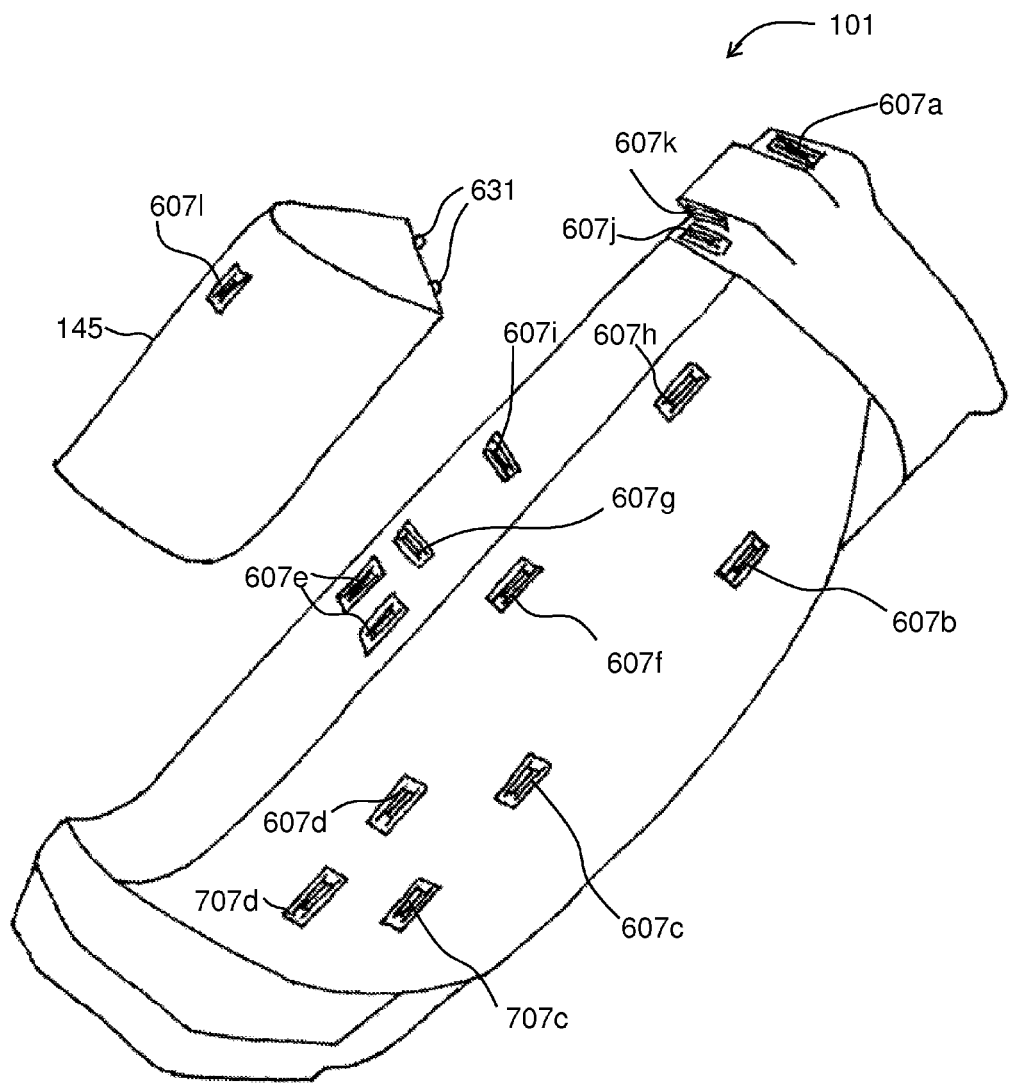
FIG. 8 is a system for interchangeable components according to certain embodiments.

FIG. 8 shows a storage compartment 145 to be held in place by an attachment tag, and that could be manually removed and re-coupled. Visibly protruding from a distal side of compartment 145 are two of tongue 631 from mounting assemblies 601. A top surface of bag 101 includes two mounting tracks 607*e* located to receive the two tongues.

Bag 101 is depicted as including mounting tracks 607*a-k* and non-locking assemblies 707*c* and 707*d*. Also, compartment 145 is shown having a mounting track 6071 on a surface thereof. Any combination of mounting tracks may be included. This allows a golfer to attach any desired compartments or other features, such as any of those shown herein, to bag 101. In this way, a golfer can have a golf bag 101 with a plurality of pockets, wherein each pocket comprises an attachment mechanism and is detachable and re-attachable to the golf bag.

Golf bag 101 may further include one or more other beneficial features.

In some embodiments, bag 101 includes an energy collection device 215. An energy collection device can be, for example, a photovoltaic cell or a connector for connecting to a source of power. In some embodiments, the energy collection device comprises a reverse electrowetting electricity generator. Such a generator can collect energy through the interaction of arrays of moving microscopic liquid droplets with nanometer-thick multilayer dielectric films. This can produce high power densities, up to $10^3 Wm^{-2}$ based on a range of mechanical forces and displacements. Such a generator can produce a range of currents and voltages, from several volts to tens of volts and is suited for energy harvesting from mechanical energy sources such as the swinging of straps while a person walks while wearing a golf bag. See, e.g., Krupenkin and Taylor, 2011, Reverse electrowetting as a new approach to high-power energy harvesting, Nat Com 2:448.

In some embodiments, energy collection device 215 comprises an pluggable connection point able to be inserted into a socket or an in-car power point ("cigarette lighter" style).

Bag 101 may further include other materials and designs to minimize resource consumption. For example, any part of bag 101 (e.g., all or a part of the extended body) may include a fabric 511 that includes recycled material. In some embodiments, the recycled material is made from discarded plastic. The extended body may include a fabric 511 that includes ripstop polyester, nylon, or similar.

In some embodiments, bag 101 includes at least one internal divider comprising a graphite shaft salvaged from a previously-used golf club. For example, internal divides can include fabric that is given shape and rigidity by including a portion of a used golf shaft therein (e.g., a golf club shaft with one or both ends cut down to a preferred length).

Other features that can be included include at least one pocket dimensioned to receive a 12 ounce can, wheels 527 optionally that are hidden when the golf bag is being carried, pads, straps, windows, outlets, or other features.

Figure 9:
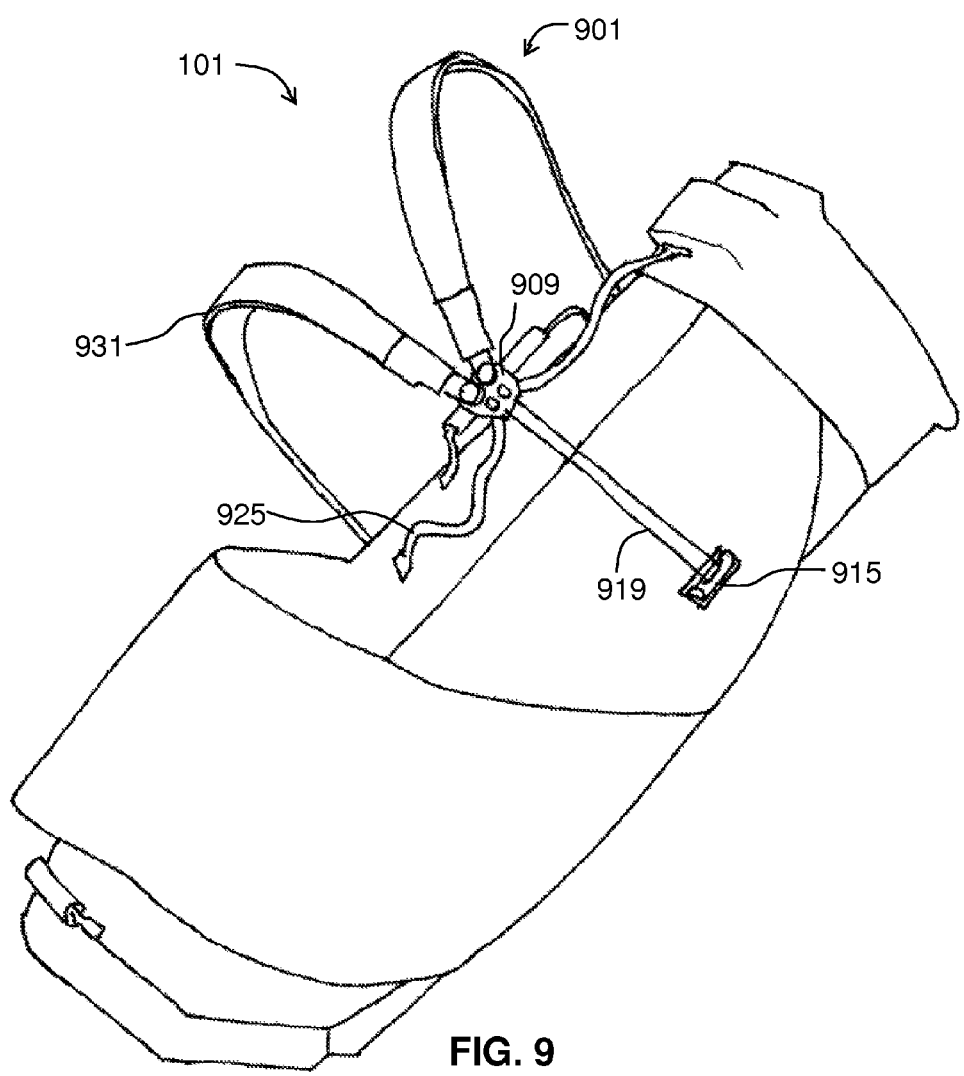
FIG. 9 presents a golf bag with retractable straps.

FIG. 9 shows a golf bag 101 with retractable strap system 901. In some embodiments, golf bag 101 includes automatically retracting straps.

It has been found that golf bag straps are a particular problem while they are not being used. They snag on parts of cars when being loaded, for example. Golfers get frustrated because they want no straps while not using them but want straps when walking and carrying a bag, but in the prior art, golfers could not have it both ways.

Golf bag 101 as shown in FIG. 9 includes an extended body having a closed end 133, an open end 103, a top surface area 149, a bottom surface area 123, a right side surface area 127, and a left side surface area 151. Golf bag 101 includes a retractable strap system 901. Retractable strap system 901 includes two of shoulder strap 931 and waist strap 925.

Retractable strap system includes a tensioner 915 to snug the retractable straps against the extended body through the use of retraction cords 919 (here shown as two cords).

Retractable strap system is shown including a five-point buckle 909, although other mechanisms for attaching straps will be appreciated by those of skill in the art and are included in the invention.

Figure 10:
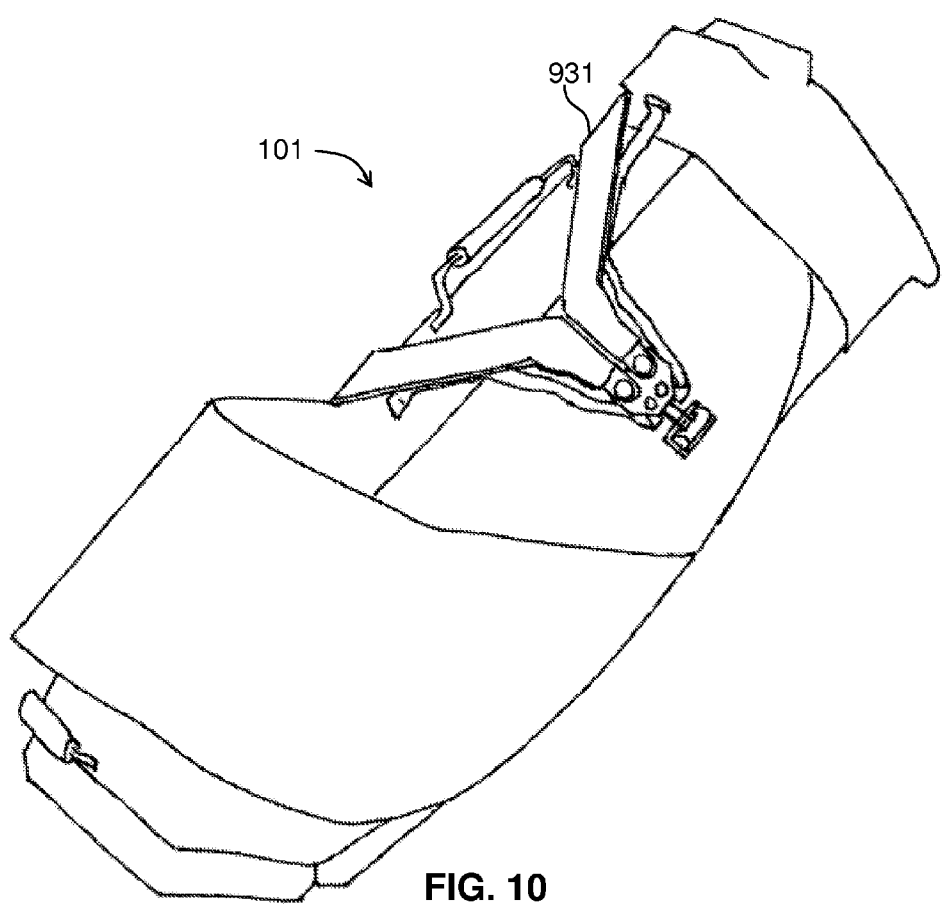
FIG. 10 depicts a golf bag will retracted straps.

FIG. 10 shows a golf bag 101 with retractable strap system 901 in the retracted position with straps 931 snug against the extended body. While straps 931 may protrude above a surface of the bag (e.g., by a thickness of the straps), in some embodiments, a surface of the bag has a cutaway channel that receives the straps to create a flush outer surface.

Straps 931 are preferably dimensioned to optimize a location of a center of gravity of bag 101 while being carried.

Figure 11:
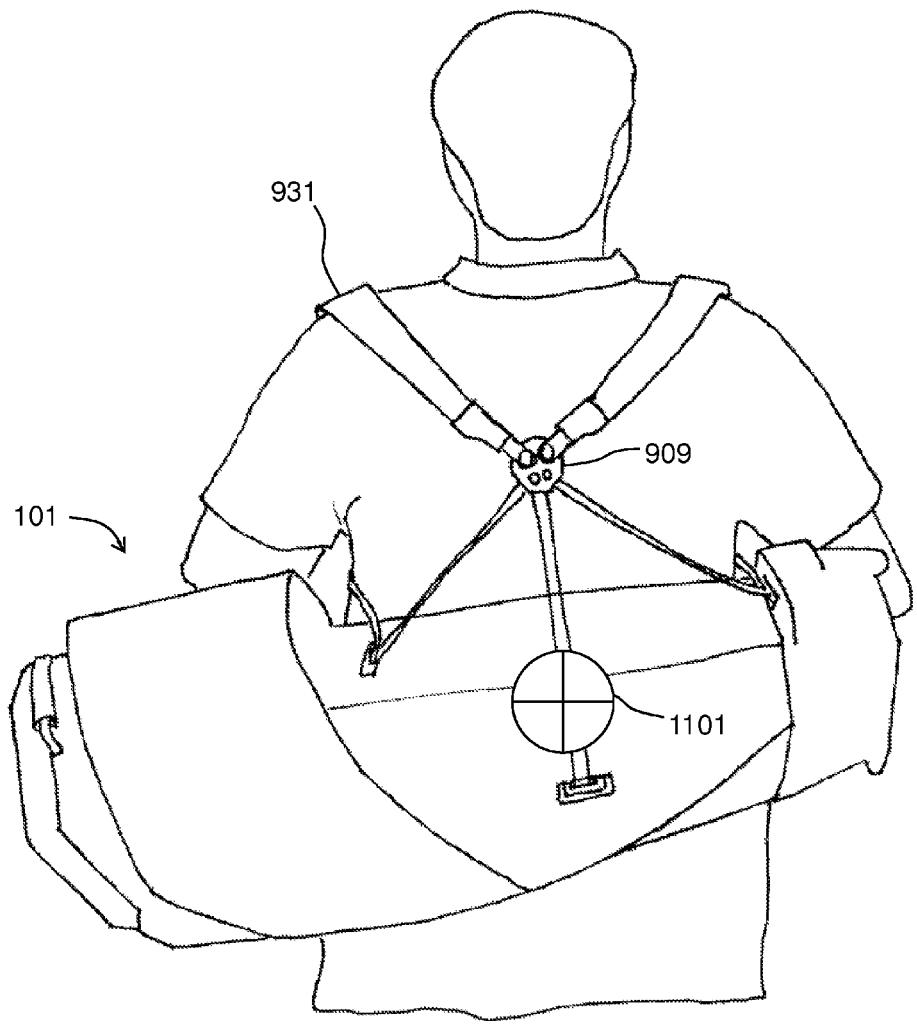
FIG. 11 diagrams use of a strap system.

FIG. 11 shows an embodiment in which retractable strap system 901 is dimensioned to position a center of a gravity 1101 of the bag 101, when loaded and worn, in a plane that bisects the wearer and contains a center of gravity of the wearer.

Figure 12:
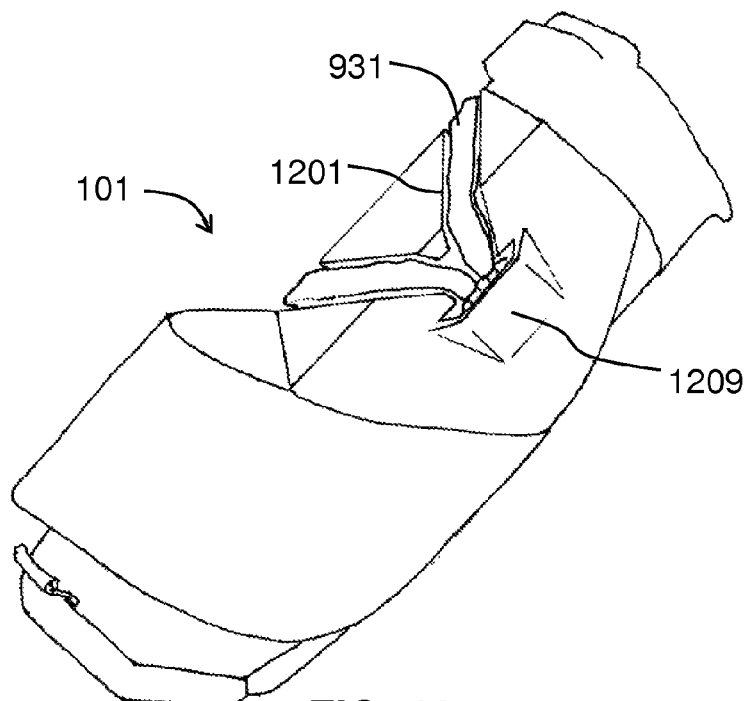
FIGS. 12 & 13 show golf bags with retracted straps according to embodiments.

FIG. 12 depicts an embodiment in which a surface of the bag 101 has a cutaway channel 1201 that receives the straps to create a flush outer surface. Additionally, bag 101 in FIG. 12 has an optional gusseted pocket 1209 dimensioned to receive and conceal buckle 909.

Figure 13:
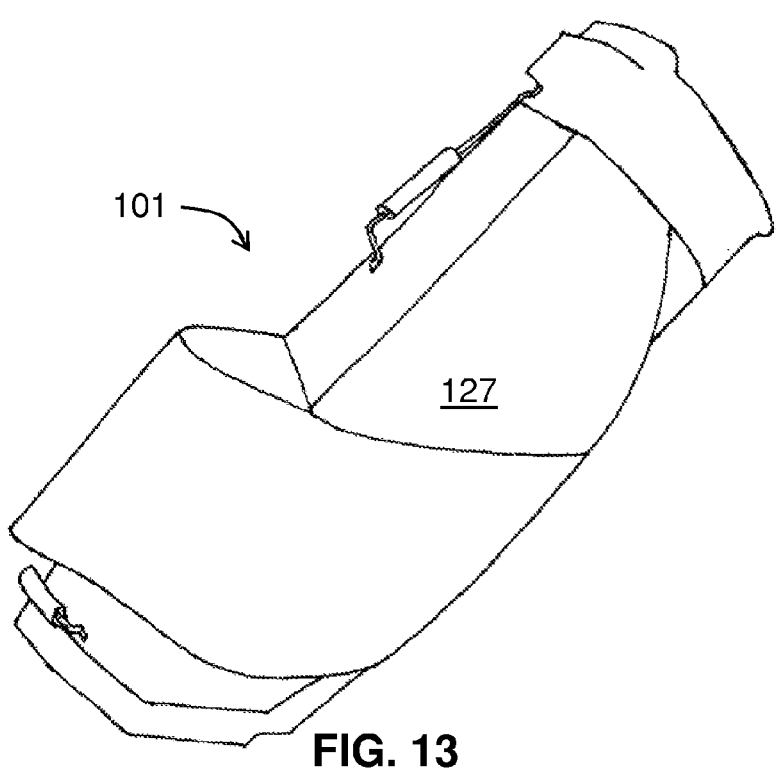

FIG. 13 shows an embodiment in which retractable strap system 901 is substantially concealed by a portion of the extended body when in the retracted position. Here, at least a top surface area 149 and a right side surface area 127 form a flap that conceals straps 931 and other parts of retractable strap system 901. Note that the connecting strap of handle 159 can extend through a hole in top surface area 149 and be attached to a structural component of the extended body of golf bag 101.

Golf bag 101 may further include other features to offer useful benefits such as, for example, one or more of a window, a tether, a useful material, or other features.

In certain embodiments, an area of bag 101 includes a window 103 for viewing something inside of the bag or inside of a pocket thereof.

Figure 14:
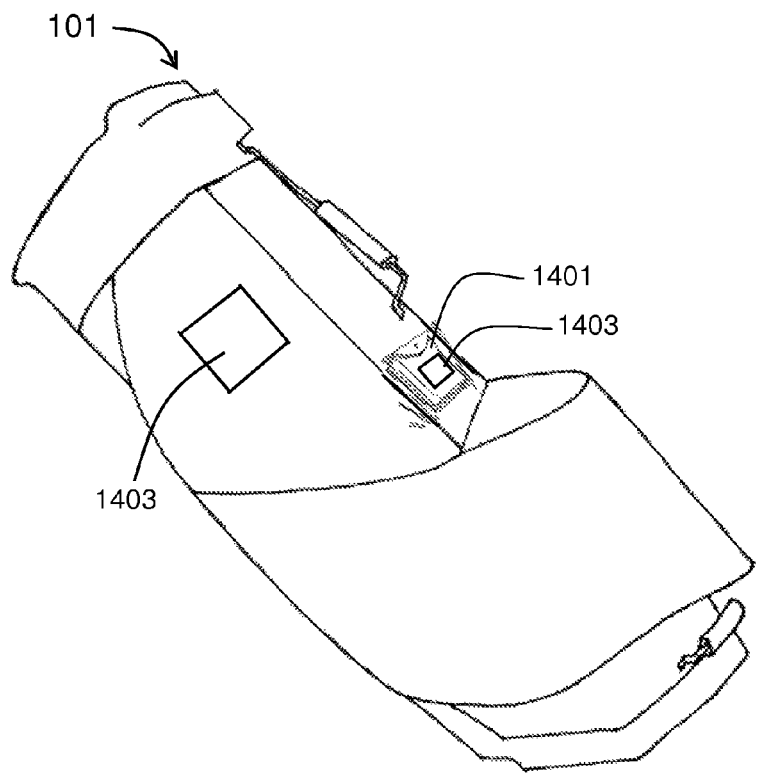
FIG. 14 shows a bag with windows.

FIG. 14 depicts a bag with a removable pocket 1401. A panel of pocket 1401 includes a window 1403. Also, bag 101 includes a window 1403 revealing contents of bag 101. Window 1403 can include a see-through material or an open aperture. FIG. 14 shows window 1403 including a transparent material such as a plastic as a see-through material. Window 1403 could alternatively or additionally include no material, a screen, or a mesh as a see-through material. Any material that can be looked through can provide see-through material, such as mesh or web, for example, as soccer-ball bags are made from. Window 1403 can be provided by a highly transparent material such as the nylon material sold under the trademark NYLON CAST or NYLON BIAX from Transilwrap Company, Inc. (Franklin Park, Ill.). These materials offer high transparency, excellent durability and good gas, grease and moisture barrier properties as well as puncture and crack resistance.

In certain embodiments, club bag 101 includes a tether. A tether, generally, is a string-like or strap-like portion of material either provided along with, fastened to, or integrally formed with club bag 101. In certain embodiments, a tether extends from bag 101 connected via a detachable connection system.

Figure 15:
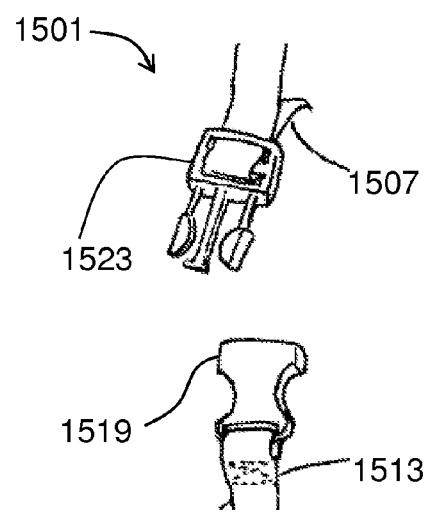
FIG. 15 reveals a binding system.

FIG. 15 shows a plastic fastener system 1501 in which strap 1507 is shown with clip 1523 and strap 1513 is shown with housing 1519. Strap 1501 may be a tether extending away from a surface of bag 101.

A tether can include an extension of material, for example, material of a panel of club bag 101. A tether can include a cord or string-like member, for example of wire, nylon, wool, leather, hemp, or other material. It can be advantageous to provide a tether with club bag 101 in which the tether connects to a removable head cover 211. A golfer may not want to drop or loose the cover from a golf bag or golf cart. Further, by supplying tether with club bag 101 it can be ensured that club bag 101 and the tether match or complement one another, in color or material choice, for example. In some embodiments, a tether has a hook or fastening mechanism at either or both ends or is designed to extend through a window 1403 (i.e., keys can be tethered and kept inside of a bag 101 or a pocket thereof but pulled through window 1403 to be used, without untethering).

In some embodiments, a pocket or compartment of bag 101 include material in a gusset form, e.g., with accordion folds (e.g., an edge of storage pocket 229 in FIG. 2 or a gusset in pocket 1209 in FIG. 12 may be expandable and collapsible). A pocket may be provided filled with a expandable or compressible gusset including, for example, fabric, TYVEK, or other material. In certain embodiments, a gusset is provided as a panel of club bag 101, allowing bag 101 to expand. A gusset, generally, includes a zigzag, or accordion, folding area and defines a first area at rest, and can be expanded to define a larger area or compressed to define a smaller area.

In some embodiments, at least one panel of material or portion of club bag 101 may be tactually distinguishable from a remainder of club bag 101. For example, bottom surface area 133 may be texturized, rubberized, and/or otherwise made to have increased tackiness to provide a good grip and prevent sliding in the back of a car.

In certain embodiments, an inside of handle 139 or handle 159 has a grip member mounted thereto, the grip member optionally including divots, ridges, or other elements. In some embodiments, a grip member includes a protruding ridge-like element with one or more crescent hollows. A crescent hollow can have a radius substantially similar to the cross section of a finger of a human hand. By presenting a ridge having a row of crescent hollows, for example, four crescent hollows, the grip member can offer a useful handgrip, a visual communication to a user that handle 139 or handle 159 is intended as a handgrip, or both. It will be appreciated—for the purposes of illustration and analogy and without limit—that a grip member with a series of four crescent hollows may generally present an appearance similar to a part of a handgrip on the handlebars of a bicycle. A grip member of the invention can comprise rubber, plastic, leather, neoprene, any other material known in the art, or a combination thereof.

Further, it will be appreciated that the connection of club bag components, if so required, may vary to include, for example, stitching, riveting, welding, stapling, adhesive bonding, hook and loop type fasteners, and/or any other suitable joining technology.

Typical materials for club bag 101 may include, for example, neoprene, mesh, leather, vinyl, fabric, reinforced fabric, molded polymers, plastics, others, or any combination thereof. Optionally, a knit or ribbed elastic material may be used for a flexible portion such as from neoprene, elasticized fabric, a ribbed and elasticized fabric, and/or similar expansible material. In some embodiments, bag 101 includes recycled material, thereby increasing an appeal to the environmentally minded consumer while also offering the manufacturer a sustainable product to make and sell, allowing the manufacturer to provide products for longer into the future. Material for bag 101 can be renewable or organic, such as hemp fiber. Hemp fiber and similar materials are durable and light. Bag 101 may include a material that decomposes readily or harmlessly, such as photodegradable or biodegradable materials. In some embodiments, bag 101 includes a photodegradable material, for example, on the inside surface, or as a rigid panel insert into a thin (e.g., nylon, cotton, polyester, leather, etc.) outer fabric part. An exemplary photodegradable material for incorporation into club bag 101 is low-density polyethylene, although any photodegradable material may be used, for example, as described in U.S. Pat. No. 4,042,765, incorporated by reference herein in its entirety. In certain embodiments, club bag 101 includes biodegradable material, including, for example, cotton, hemp, cellophane, biodegradable plastic, polyhydroxybutyrate, polyvinyl alcohol, polyglycolide, polycaprolactone, polylactic acid, or similar. In some embodiments, club bag 101 includes a bioplastic or organic plastic such as a plastic derived from renewable biomass sources, such as vegetable oil, corn starch, pea starch, or microbiota, rather than fossil-fuel plastics which are derived from petroleum. Window 1403 can optionally include cellophane. In some embodiments, a corrugated material is used to increase resiliency or decrease material. Exemplary corrugated materials include cardboards, fiberboards, plastics (e.g., coroplast or any of the corrugated plastic sheeting sold under the trademarks INTEPRO, CORREX, or TWINPLAST), and stiff fabrics and can include any of A-Flute through F-Flute construction. In some embodiments, a plastic material is included having an SPI resin identification code of 5 or lower, or 4 or lower. In some embodiments, polylactic acid (e.g., made from corn starch or cane sugar) is used in making club bag 101.

In some embodiments, bag 101 has a panel of material as an insert, filling a cutaway in a surrounding material. An insert panel can be translucent or transparent to provide a window 1403, as discussed above, or can be opaque. An insert panel can provide added strength at key points of wear. A see-through panel or an opaque panel can be provided by any suitable material known in the art including any of those described herein. Suitable materials include rigid and flexible vinyl, polyurethane foam, ABS, acetate, polyethylene, polypropylene, color coded shim stock, Mylar, Kapton, Teflon, and Nylon such as are available, for example, from Die-Cut Products Co. (Cleveland, Ohio). Other suitable materials include flexible or rigid plastic films that can be clear, colored, or translucent. Such films can include UHMW polyethylene film or PTFE film such as are available in thicknesses ranging from 2 mil. to 60 mil. from Fluoro-Plastics, Inc. (Philadelphia, Pa.). Such materials can offer tensile strengths less than 1,500 psi, elongation up to 200 percent & dielectric strengths of 500 V/mil. Suitable materials further include flexible plastic films made from LDPE & MDPE polyethylene resins such as are available from Brentwood Plastics, Inc. (Saint Louis, Mo.). Plastic materials of polyester, vinyl, acetate, polyethylene, or polypropylene types can provide flexible or porous panel inserts that can be seamed and bonded, such as those materials available from Grafix Plastics, a division of Graphic Art Systems, Inc. (Cleveland, Ohio). Insert panels can be made fire retardant, anti-static, low-skid, or embossed, and can be welded, for example, using RF, heat, or ultrasonic energy. Insert panels can be cut from sheets that are obtained pre-embossed with a pattern such as taffeta, box taffeta, diamond, matte finish, micro matte, frosted, dimpled, linen, leather grain, diamond plate, polished, or woven textured. Such materials can be obtained, for example, from Bloomer Plastics, Inc. (Bloomer, Wis.).

In certain embodiments, bag 101 includes a rubber material. For example, an insert panel can include rubber to create resilience or a desired aesthetic effect. Suitable rubber materials and related materials include, without limit, natural rubber, EPDM, EPT, EPR, SBR, neoprene, nitrile, millable gum, epichlorohydrin, Silicone, polyacrylate, flourisilicone, butyl rubber, and flourelastom, which materials are available from firms such as Bloomer Plastics, Inc.

In certain embodiments, bag 101 includes a polyvinyl chloride (PVC) material, for example, cut from a sheet. PVC, PVC-alloy, and CPVC film and sheet products in fire rated, ultra high impact, corrosion resistant, and economy grades can be obtained smooth or with textures and in a wide variety of solid and integral colors (e.g., metallic) and can be thermoformed or machined. A variety of such PVC materials are sold under the trademark BOLTARON by Boltaron (Newcomerstown, Ohio). Such materials include the monolithic Type 1 PVC sheet sold under the trademark BOLTARON 1050, which is free of pits, voids and inclusions, and not subject to delamination. A high heat distortion, fire retardant, extruded thermoplastic sheet designed to meet stringent FAA flammability requirements and higher in-service temperature applications can be provided by the PVC sold under the mark BOLTARON 4205.

In certain embodiments, bag 101 includes (e.g., at bottom 133) polytetrafluoroethylene such as that sold under the trademark TEFLON and made by E.I. Du Pont De Nemours and Company (Wilmington, Del.).

A golf bag of the invention can further include an environmentally friendly material that allows a firm to produce a product more sustainably and also promote consumer acceptance.

Any portion of bag 101 can include, for example, a recycled plastic or microfiber such as the high quality ecological microfiber Dinamica from MIKO S.r.l. (Gorizia, Italy). Dinamica is made via a water-based manufacturing recycling process with minimal environmental impact. The faux suede material is produced from a combination of recycled polyester and polyurethane fibers, and is also 100 percent recyclable. Dinamica is strong at seams, light-fast, wear-resistant and the microfibers do not pill (i.e., after extensive use, unsightly small bobbles don't build up on the fabric). The microfiber provides softness, elasticity and breathability, and because it is waterproof, it also proves resistant to stains. Dinamica is made via non-toxic production methods. Dinamica is available in a full spectrum of colors including light and pastel shades with sunlight-resistant dyes that do not fade over time. In certain embodiments, one or more Dinamica portions include a design made, for example, by laser, embossing, or perforation, such as a corporate logo, decorative element, or cells (e.g., a cell pattern).

In certain embodiments, a portion of bag 101 includes an environmentally friendly plastic such as one made from agricultural or marine raw material or a biodegradable plastic. Such materials include the biaxially oriented film biopolymer 4043D or 4032D film sold under the trademark Ingeo by Natureworks LLC (Minnetonka, Minn.), which can be extruded, made of polylactic acid, or compostable. In certain embodiments, bag 101 includes biopolymer 7001D injection stretch blow molded plastic sold under the trademark INGEO by Natureworks LLC. Other exemplary materials include flexible PVC extrusion compounds sold under the trademark APEX by Teknor Apex Company (Pawtucket, R.I.) or flexible PVC sold under the trademark BIOVINYL from Teknor Apex Company (Pawtucket, R.I.). Flexible PVC sold under the trademark BIOVINYL includes a bio-based plasticizer sold under the trademark DOW ECOLIBRIUM. This provides a rapidly renewable alternative that is phthalate free and offers a sustainable option with a carbon footprint that rivals all polyolefins, polyurethane and most commercial biopolymers. Flexible PVC sold under the trademark BIOVINYL provides all the benefits of traditional vinyl such as processability, UV resistance and durability as well as improved heat stability, plasticizer efficiency, abrasion resistance and tensile strength.

In certain embodiments, a plastic material in bag 101 includes an additive to encourage the plastic to degrade such as the additive sold under the trademark ECOPURE by Bio-Tec Environmental LLC (Albuquerque, N. Mex.). When such a biodegradable plastics additive is mixed into raw plastic (e.g., at less than 1%), it allows that plastic to break down when placed in a microbe rich environment, such as a landfill or compost facility.

By using materials such as those exemplified by the discussions herein, a bag can be provided that is lightweight, strong, environmentally friendly, and attractive.

Further, a portion of the material of club bag 101 can include a cell structure to decrease weight while maintaining strength.

Figure 16:
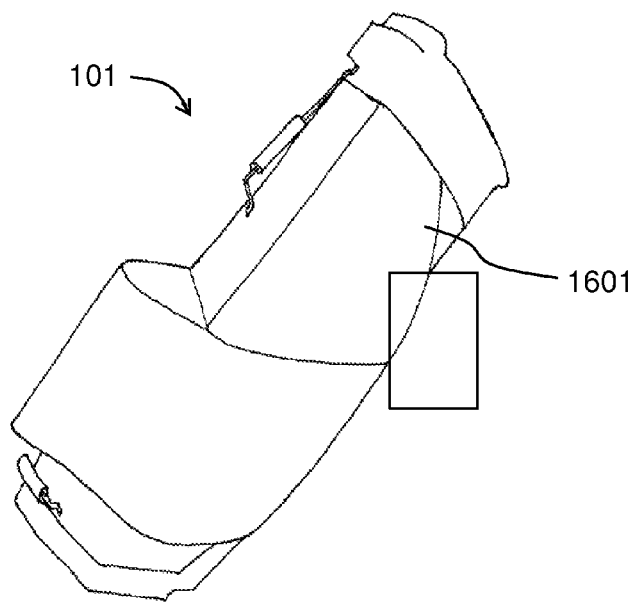
FIG. 16 presents use of cell-structure material in a golf bag.

FIG. 16 shows a golf bag 101 in which a portion of the material includes a panel 1601 with a cell structure material.

Figure 17:
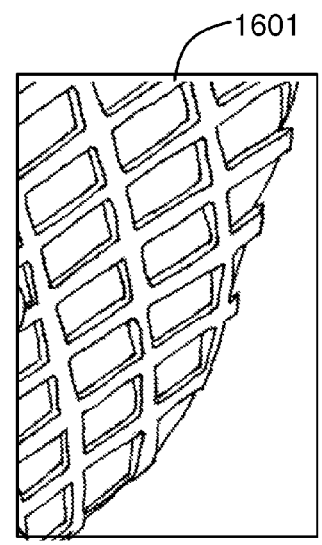
FIG. 17 gives a detailed view of cell structure material.

FIG. 17 shows a close-up view of panel 1601 showing a cell structure material. A cell structure can refer to a pattern of hollowed-out areas that decrease a volume of material in the hollows, while leaving a surrounding mesh-like framework giving the material an overall thickness, or an effective thickness, of the thickness of the mesh-like structure. Cell structure material may include a honeycomb-like cellular structure comprising a series of hexagonal, rectangular, square, triangular, trapezoidal, rhombus, or other hollows in the surface of panel 1601.

Club bag 101 of the invention can have any of a variety of colorful or decorative finishes, including, for example, a whimsical color pattern, a faux leather finish, a cell-patterned surface, clear panels, translucent panels (any surface of which may be textured or smooth). Further, since a cover according to the invention can be provided to reveal a portion of a covered club head, such covers provide a natural place to locate branding information, graphics, or other indicia that complement the appearance of a club head or draw attention to it.

A functional accessory on a bag 101 can include any of a variety of tools, displays, and novelties, including utilities that provide valuable service to a serious professional as well as whimsical novelties that bring pleasure and unexpected delight to a golfer. One insight of the invention includes the view that enjoyment will be brought to people through their being encouraged to discover the joy of golf. Golf can be made more appealing to newcomers, and newcomers can be encouraged to see the sport as accessible, by providing tools, gear, and accessories that embody a fun and playful spirit and that communicate inspiring sentiments.

In certain embodiments, an encouraging or inspiring sentiment is communicated to a golfer by a message display on a golf bag. For example, bag 101 can include a message tag with an opening dimensioned to receive a rectangle of paper or cardboard, which can be shipped with a sheet of pre-selected messages, each on a perforated rectangle dimensioned to fit into the tag, or can be shipped with blanks. A hang tag can have novelty shapes and can include a message (see, e.g., heart-shaped tag in U.S. Pat. No. 6,202,335, the contents of which are incorporated by reference hereby in their entirety). Adding a message tag offers important identification benefits. For example, a bag's owner can be identified.

Figure 18:
FIG. 18 is an interchangeable slogan tag.

As shown in FIG. 18, in certain embodiments, bag 101 includes one or more of stud 1801 (e.g., plastic or metal) configured to mate with a strip 1807 (e.g., plastic or fabric), or a set of strips, via one or more of a corresponding hole 1805. Each strip 1807 has a message printed on it, and a user can removably mount a strip on the golf bag to display a message that comports with their mood. Each stud 1801 can have a T-shaped head, and each corresponding hole 1805 in strip 1807 can be elongated oval (optionally with a grommet) that fits over the T-shaped head of stud 1801 in one direction, and can then be rotated to secure the strip in place (e.g., the strip can be flexible, such as fabric, allowing each end to be rotated independently). Removable portions are discussed in U.S. Pat. No. 5,852,829 (the contents of which are hereby incorporated by reference in their entirety).

In certain embodiments, changeable messages are provided on fabric panels that can be removably attached, entirely or partially, through the use of snaps, hook-and-loop fasteners such as those sold under the trademark VELCRO by Velcro USA Inc. (Manchester, N.H.), or similar (see, e.g., U.S. Pub. 2003/0172430, the contents of which are hereby incorporated by reference in their entirety).

In certain embodiments, a golf bag is provided with a set of pre-printed hang tags or blanks that can be written on (e.g., with a permanent marker sold under the trademark SHARPIE) and fastened to the cover with a filament, for example, using a tag attachment tool. Tags and attachment tools are discussed in U.S. Pub. 2005/0178037, the contents of which are hereby incorporated by reference in their entirety.

Figure 19:
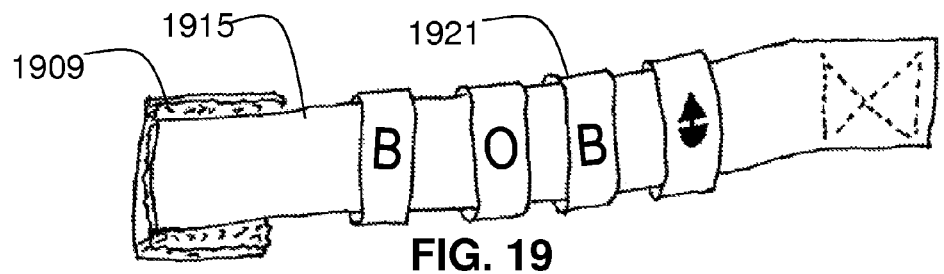
FIG. 19 illustrates a customizable slogan tag.

As shown in FIG. 19, bag 101 can have a band 1915 (e.g., fabric or flexible plastic, for example, in a strap-shape) fastened to a surface at one end and detachably fastened at another end (e.g., by hook-and-loop fasteners 1909). Bag 101 can be provided with one or more of an exchangeable closed loop member 1921 that are slidably removable from the band, and each closed loop member 1921 can include a pre-printed or consumer-written message on it. In this way, a golfer can display a customized message on the cover. Removable closed loop members are discussed in U.S. Pat. No. 6,880,364, the contents of which are hereby incorporated by reference in their entirety. A changeable message can also be displayed in an electronic display, for example, as discussed in U.S. Pub. 2010/0313334, the contents of which are hereby incorporated by reference in their entirety.

In certain embodiments, a golf bag includes a substantially planar pocket with a see-through panel, for example, as described in U.S. Pat. No. 6,231,233, the contents of which are hereby incorporated by reference in their entirety. A slogan can be provided on a card or panel (e.g., cardboard, plastic, white-board material, etc.) that can be slipped into the planar pocket, thus allowing a golfer to display a changeable message.

A tag or panel can include a humorous reminder, inspirational message, slogan, or similar. Using mechanisms such as those described above, the invention provides a golf bag that bears a message that can be changed by the consumer. The message panel can be publically displayed on an outside of the cover, can be kept personally on an inside of the cover, or can be retractable. In certain embodiments, a message is on a fabric tag that can hang down from within the cover to display a message, and can also be coiled up and snapped or fastened entirely within a cover. Changeable messages are discussed in U.S. Pat. No. 6,311,332; U.S. Pat. No. 4,918,758; U.S. Pub. 2004/0194363; U.S. Pub. 2004/0026280; and U.S. Pub. 2003/0172430, the contents of which are hereby incorporated by reference in their entirety.

In certain embodiments, the invention provides a golf bag that provides useful functionality or communicates fun and visual interest through color change. A portion of, or all of, the golf bag can be provided that changes color by including a color-changing material such as, for example, a photochromic or thermo-chromic material. Use of a photochromic material provides a golf bag that changes color when brought from relative shade into bright sunlight, for example.

Color-changing is a useful property in a golf bag. A golfer may desire a distinctive, catchy color so that their bag is easy to spot or recognize, but may prefer a bag that changes to a darker color when out on a very sunny golf course, so that the bag is less of a visual distraction. Golf is understood to be a very mental game, and golfers excel when their playing environments are free of a visual distractions. Additionally, color changing materials can be employed to provide information that is only visible in certain conditions. For example, an indicia such as a safety warning may be printed in a material that changes from a first color to a second color, and the surrounding background area may be the second color. Under a first conditions (e.g., indoors in an air conditioned golf shop) the indicia may be discernible. Under a second conditions (e.g., out on a sunny golf course) the indicia may be concealed to minimize distractions.

A golf bag for a golf club is a particularly good place to include a color-changing material. Some golfers may see color-changing materials as not reflecting a serious attitude and thus they may be resistant to purchasing an actual playing piece such as a driver, or even a grip for a golf club, that includes a color-changing material. Some golfers may like color-changing materials but perceive that a golf club that includes a color-changing material was designed with fun as a priority over playability. Thus, a golf bag is a good place to include such material.

In certain embodiments, all or a portion of a golf bag can comprise a photochromic material. The term "photochromic" generally refers to a reversible change of color under exposure to light, for example by a chromene or a silver halide salt. For example, in some embodiments, the golf bag can comprise a crown portion that darkens when exposed to light, for example, to make a different logo appear under different lighting conditions. Photochromic materials are discussed in U.S. Pat. No. 5,843,548; U.S. Pub. 2007/0054594; and U.S. Pub. 2006/0147708; the contents of each of which are hereby incorporated by reference in their entirety.

In certain embodiments, all or a portion of a golf bag comprises a thermo-chromic material. Thermo-chromic materials, generally, include those that change color in a temperature sensitive manner. Thermo-chromic material can include a semi-solid liquid crystal mixture applied as a thin film. Such materials are discussed in U.S. Pat. No. 4,681,791; U.S. Pat. No. 4,642,250; U.S. Pub. 2010/0248852; U.S. Pub. 2009/0046760; and U.S. Pub. 2007/0252115, the contents of each of which are incorporated by reference herein in their entirety for all purposes.

A golf bag according to certain embodiments of the invention includes an audio device that can deliver a slogan, song, or other audio clip. In certain embodiments, an audio device is provided in which a consumer can record his or her own audio sound and play that sound back at the push of a button. The audio device can be incorporated into layers of the material of the golf bag or mounted on a surface, for example, in its own plastic housing. An audio device in a golf bag can be a single or multi-use recordable electronic device or chip coupled to a power source such as a small battery and a small speaker from which a recording is played and can be heard by a golfer. Examples of similar technology are used in greeting cards which can be provided with pre-recorded greetings or audio information such as music.

An audio device in a golf bag can include a writable, electronic storage memory device 2207 (e.g., a recordable chip, small flash memory device) coupled to an activation device such as a button 2205 (e.g., housed within compartment 163). In certain embodiments, the recordable memory device 2207 is connected either directly or indirectly to a cable or jack, which allows the audio device to be connected to an electronic device such as a CD player, MP3 player, smart-phone or other similar processing device 2201. The cable is optionally supplied as an accessory with the golf bag and is removable from the device. In a preferred embodiment, an audio device is provided as an on-bag computing device 3401 that includes a non-transitory memory 2207 coupled to a processor 2209 and at least one audio output device 2205 (such as a speaker 3213 or headphone jack). A golfer can have audio information (such as favorite songs or golf instructions) stored in the memory for access out on the golf course. The audio-enabled computing device 3401 and speaker 3213 may be housed within compartment 163 (see FIG. 32) for protection.

In another embodiment, the chip may be provided as part of a circuit that is equipped with a wireless receiver, such as a blue tooth receiver or the like, to enable an electronic device such as a computer, CD player, MP3 player, smart-phone or other similar processing device to transmit user recorded or assembled audio information wirelessly to the chip for later playback. The audio device permits a user to select one or more prerecorded music, voice or sound files which the user himself or herself has recorded or which the user has downloaded and stored on the audio device. The user may select a single file or the user may combine together multiple files.

In this configuration, the chip functions within the audio device as a plug-and-play storage device that allows a user to select a file or files and transfer them from, for example, a computer or phone, to the recordable chip using the supplied cable or wirelessly. The cable may be a reusable cable such as a USB, high speed serial bus, or other currently accepted standard connectable data communication cable or alternatively may be a standard stereo mini plug cable. Sound playing devices are described in U.S. Pat. No. 6,330,427; U.S. Pat. No. 4,840,371; and U.S. Pub. 2011/0088143, the contents of each of which are incorporated by reference herein in their entirety.

In certain embodiments, an audio device is included that mimics or functions as a novelty musical instrument. For example, bag 101 can include a keyboard mimicking a portion of a piano keyboard and each key can be configured to play a tone corresponding to a piano key. A functional keyboard disposed on a golf bag gives a musical golfer something to do while they wait for their turn to make a shot. The golfer may entertain and delight the other golfers on the course. In certain embodiments, a golf bag includes touch sensitive keys that are configured to play 8 different notes (e.g., do re mi fa so la ti do). A keyboard audio device can include a memory chip, an on/off switch, operable keys, and an audio output mechanism such as a speaker or a jack (e.g., mini-plug). A keyboard or keypad may be a midi controller (e.g., linked to a computing device).

In certain aspects, the invention provides a golf bag all or a portion of which includes electroluminescent (EL) technology. An EL material in a golf bag generally includes a semiconductor material in, for example, a thin film or a powder form and a source of electricity such as a battery or photovoltaic cell. Different EL materials can be included to provide different colors such as, for example, zinc sulfide doped with copper to provide green; zinc sulfide doped with silver to provide blue; or zinc sulfide doped with manganese to provide orange-red. A golf bag can include an elongated light source, such as an electro-luminescent wire. One such electro-luminescent wire is commercially available from Solution Industries (Cypress, Tex.) under the Trademark FLEXWIRE. Another such electro-luminescent wire is commercially available from ELAM Electro-luminescent Industries Ltd. (Jerusalem, Israel) under the Trademark LYTEC. Another suitable electro-luminescent light source is an electroluminescent strip, such as that commercially available from E-Light Technologies Inc. (Stafford, Conn.). An EL material portion can be a flat material, such as a narrow strip or a patch that includes an EL material along a flat side. Suitable EL materials are discussed in U.S. Pat. No. 6,116,745; U.S. Pat. No. 5,479,325; U.S. Pub. 2011/0025195; U.S. Pub. 2010/0232143; and U.S. Pub. 2008/0084686, the contents of each of which are incorporated by reference herein in their entirety.

In certain aspects, a golf bag brings joy and delight to the game of golf by including a fun and pleasurable novelty accessory in the form of a squirt gun and optionally a holster mounted on golf bag 101 to hold the squirt gun. A squirt gun can be included in a squeezable bladder embodiment, a trigger and pump in reservoir embodiment, or in a high power (e.g., compressed air) embodiment. In a bladder embodiment, a squirt gun includes a deformable plastic bladder approximating the form factor of a gun such as a handgun and having a pinprick hole at the end of a barrel and a pluggable fill hole elsewhere. Squeezing the bladder body forces water out of the pin prick hole in a propelled stream. In a trigger, pump, and reservoir embodiment, each squeeze of a trigger (e.g., plastic trigger slidably mounted on a rail) operates a pump pushing water towards a nozzle in an internal hose, fed by a reservoir (e.g., the body of the squirt gun itself). In a high powered embodiment, a squirt gun based on the technology of the brand of water gun sold under the trademark SUPER SOAKER by Hasbro (Pawtucket, R.I.) is included, optionally in a holster mounted on bag 101.

It is an insight of the invention that a number of aspects of a golf bag can be uniquely selected from wide palette of offerings and that this is well suited to customizing golf bags to a customer's desires. It is a related insight that computer device technology provides a valuable tool for managing the complexity of manufacturing where customized orders are included. Accordingly, the invention provides systems and methods for providing a customized golf bag.

Figure 20:
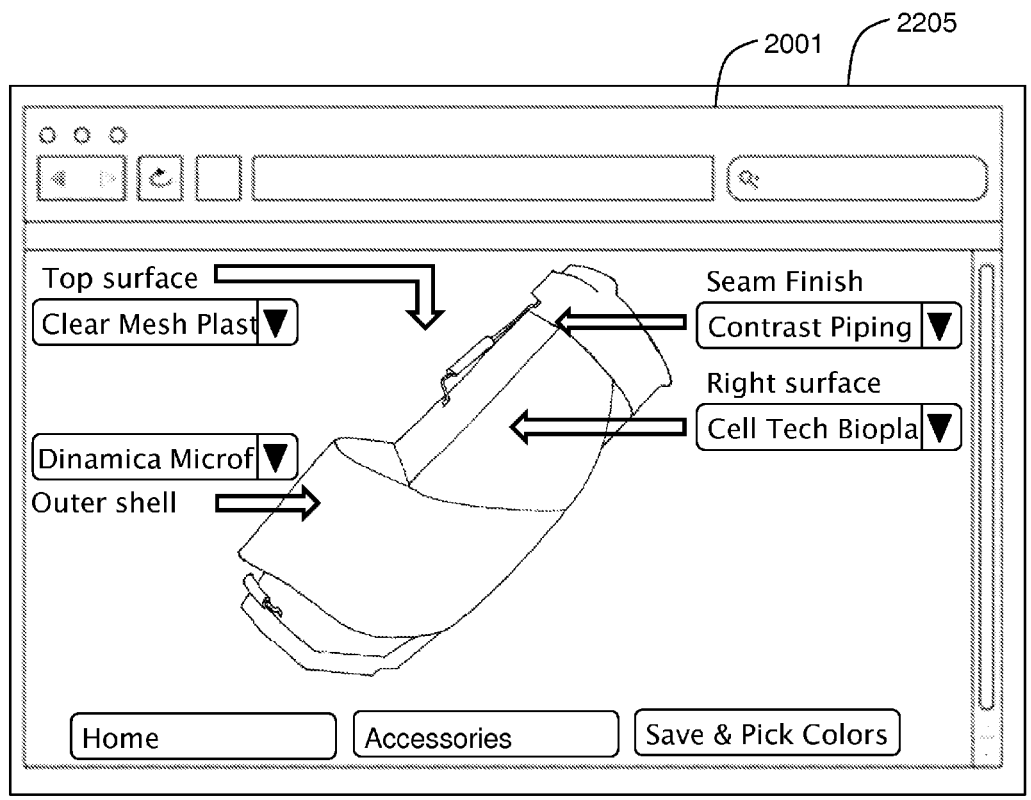
FIG. 20 reproduces an interface for ordering a custom golf bag.

Providing a customized golf bag can include offering options for one or more features that are available with a golf bag and receiving a selection from a consumer of an option. FIG. 20 depicts a display that can be used to receive a consumer's selection of one or more options for a golf bag. As shown in FIG. 20, a consumer could be given a display (e.g., in a web browser as presented via a graphical user interface (GUI)) that includes elements such as pull-down menus for choosing options. Any method of offering options and receiving selections is included, such as, for example, point-and-click selection, keyboard entry, radio buttons, and confirmation of suggested options. A selection of an option can include selecting a given option from a set of possibilities and it can also include selecting whether or not to include a certain feature at all. For example, a consumer can be offered whether or not they would like a functional accessory as part of their golf bag and, if they choose so, they can then be offered a list. Options can be offered and selections received for any aspect of a golf bag including all of those discussed herein. As indicated in FIG. 20, a consumer could choose a material for a top surface and suitable choices could include: clear mesh panel (e.g., plastic, PVC); a fabric mesh panel (e.g., nylon, cotton, polyester); a clear panel (e.g., PVC); a main material (e.g., leather, microfiber, plastic, faux leather). For main material, a customer can be offered microfiber, plastic, leather, vinyl, neoprene, a list of fabrics by brand, material or color, a fully-waterproofed material or a default. A customer could chose a seam finish (e.g., fused, hidden, matching piping, contrast piping, nylon band). A customer could choose whether to include a side panel of different material (e.g., cell tech bioplastic; hex cell plastic; recycled plastic; bi-layer fabric; plush fabric; fleece material; sandpaper-finish for interesting texture; etc.). Other features a customer could choose options for include overall finish of surface (e.g., waterproofing, matte v. gloss), sleeve material, accessory choice (e.g., bottle opener, iPad pocket, battery housing pocket, removable zippered pouch, inspirational message tag, personalized EL display (e.g., customer's name in light-up writing on surface), customer-uploaded photo printed on surface (e.g., as uploaded digitally via interface similar to one shown in FIG. 20), number of bags (e.g., customer orders bags for whole family), etc.

FIG. 20 generally shows an exemplary display 2001 as could be shown on a screen 2205 of, for example, a computer or smartphone, discussed in more detail below. In certain embodiments, FIG. 20 represents a display rendered in a web browser (e.g., a web page being displayed by Internet Explorer or Google Chrome). In some embodiments, FIG. 20 depicts a display as rendered by a dedicated computer program such as a mobile app running on a smartphone or similar portable device.

As shown in FIG. 20, receiving customer options can be done via a series of related screens. For example, a customer can choose materials for parts in a first screen, choose optional accessories in another screen, and save their choices and pick colors in another screen. However, in other embodiments, all choices are made on a single screen or a different combination of screens. In certain embodiments, choices are suggested based on inferences made according to computer program rules about a customer's likely preference. For example, if a customer orders a customized golf club in a given color (e.g., a driver with an orange head), a golf bag can be shown and suggested with a given matching or complementary color (e.g., orange main material with blue contrast piping, or all green golf bag).

Figure 21:
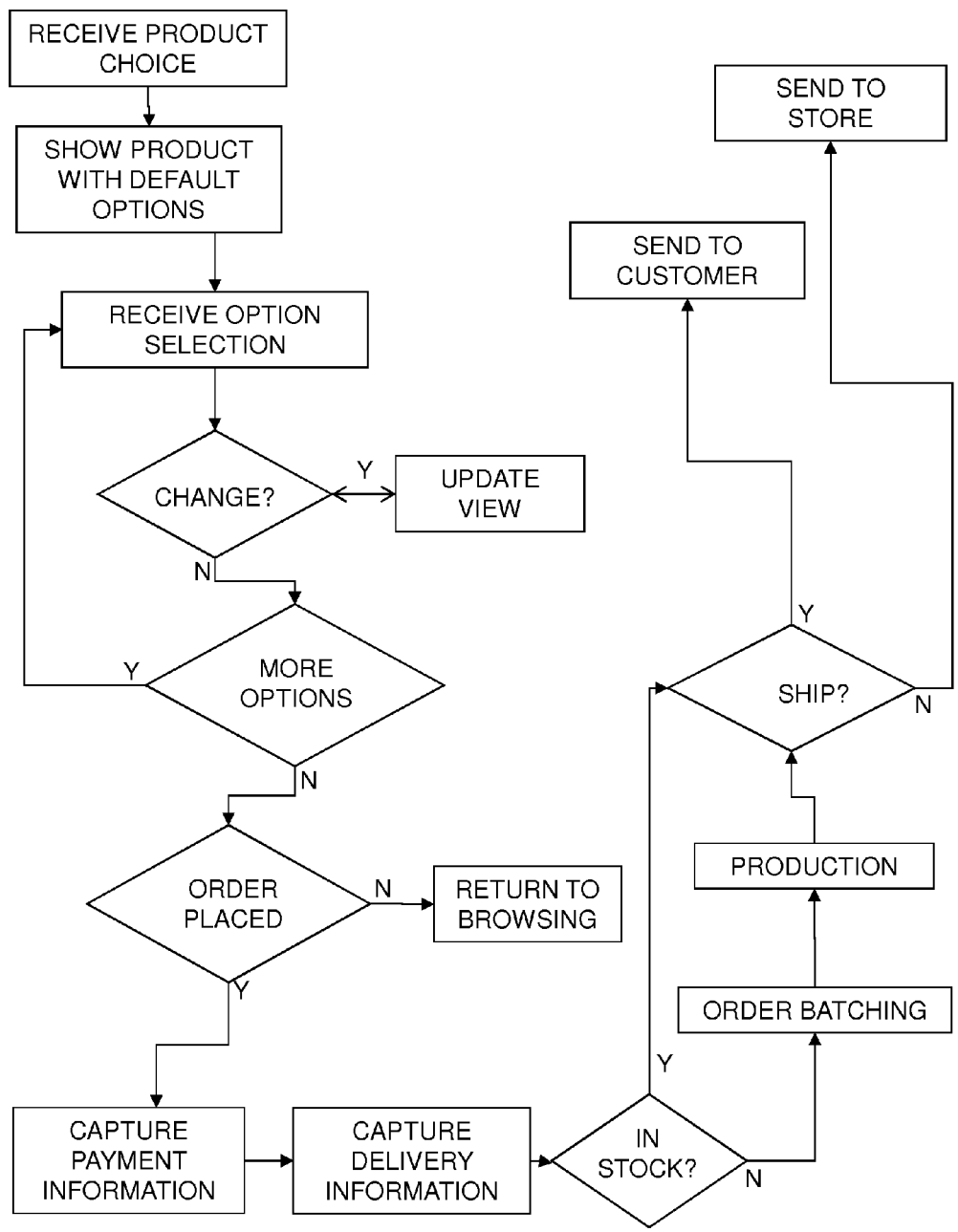
FIG. 21 diagrams a method for providing custom golf bags.

Given the variety of options a customer may choose and the variety of numbers a customer may order, the invention provides methods of receiving and preparing customized orders. FIG. 21 gives a high-level block diagram of steps of a method of providing a customized golf bag according to certain embodiments of the invention. A method of providing a customized golf bag according to certain embodiments of the invention can include receiving a customer's choice of a product (e.g., AMP-product line golf bag) and showing the customer a product example (e.g., FIG. 20). A customer's selections of an option are received and saved in a memory. If the selection reflects a change from what was previously shown, the displayed product view can be updated to show what the customer has chosen. This can be repeated for as many features as are customizable or as many features as the customer chooses to select options for.

If the customer ends up not placing an order, they can be returned to browsing (e.g., shown a web page home screen or another product screen). Their choices can be saved and displayed to them at a later web page visit.

If the customer places an order, methods of the invention include capturing information from the customer about how they will pay for the product and how they will receive it. For example, a customer can provide a credit card number over a computer network (e.g., by typing into a payment web page), and then choose shipping by expedited mail and provide their home address. Or, alternatively, a customer can indicate that they wish to use a corporate account (e.g., they are purchasing a gross of golf bags that are printed with a corporate logo which they have uploaded an image file such as a TIFF) and they can specify delivery to some site. A customer can also choose in-store pickup. In certain embodiments, a method of providing a customized bag 101 is operable in conjunction with a special event, and methods include capturing delivery information about providing the bags at the special event. For example, if Acme Golf Co is sponsoring and staffing a booth at Corporate Inc.'s charity fund-raiser, Acme Golf Co can collect information from a person at Corporate Inc. about a customized golf bag (e.g., as a promotional item or prize) via methods of the invention, and Acme Golf Co can bring the golf bag items to the booth at the charity fund-raiser.

After delivery information is captured, it is determined whether the ordered item is already in stock, as-ordered. If it is, the ordered item is shipped or prepared for delivery according to the customer's delivery information. If the ordered item is not in stock, the order is batched.

Methods of the invention include organizing sets of orders for efficient production. A computer program, executed by a processor, can make reference to information about production facilities to organize a plurality of different orders and to coordinate production instructions so that production facilities include minimal down-time while components or parts are "switched out". For example, if regular production is scheduled for ten gross of orange golf bags and ten gross of red golf bags, and customized orders have been placed for one orange golf bag, one red golf bag, one blue golf bag, and one black golf bag, then order batching can include listing the order, for example, in the following order: ten gross orange; one orange; ten gross red; one red; one blue; and one black.

Order batching further includes scheduling production of individual batches, where a batch is a sub-set of all orders identified by a computer executing program instructions according to production criteria. Batches may be scheduled according to information about production times, steps, complexity, or interrelationships involved. For example, if a bottle opener is required to be added to a golf bag at an assembly workstation where a main body of a golf bag is stitched together, while a smartphone pocket is added to a golf bag at a dedicated separate workstation and can only be added after a main body is assembled, then a batch can be prepared that is all golf bags with a bottle opener batched with all golf bags overall, while a separate batch is prepared that includes all golf bags in which a customer has ordered a smart phone pocket. Then, the second batch can be routed to the main assembly work station first, for example, to leave additional time for adding the smart phone pocket to that batch while the other batch is at the main assembly workstation so that the entire set of batches is completed at the same time.

After order batching, order information (e.g., info regarding batches, production schedules, and individual orders of golf bags) is transmitted to a production system or facility, and the ordered golf bags are produced.

After production, the golf bags are sent. If a customer has ordered a golf bag to be shipped to their home, the bag is sent to the customer. If a customer has requested in-store pickup, the golf bag is sent to the store. If a customer has requested another delivery option, it is so initiated.

Figure 22:
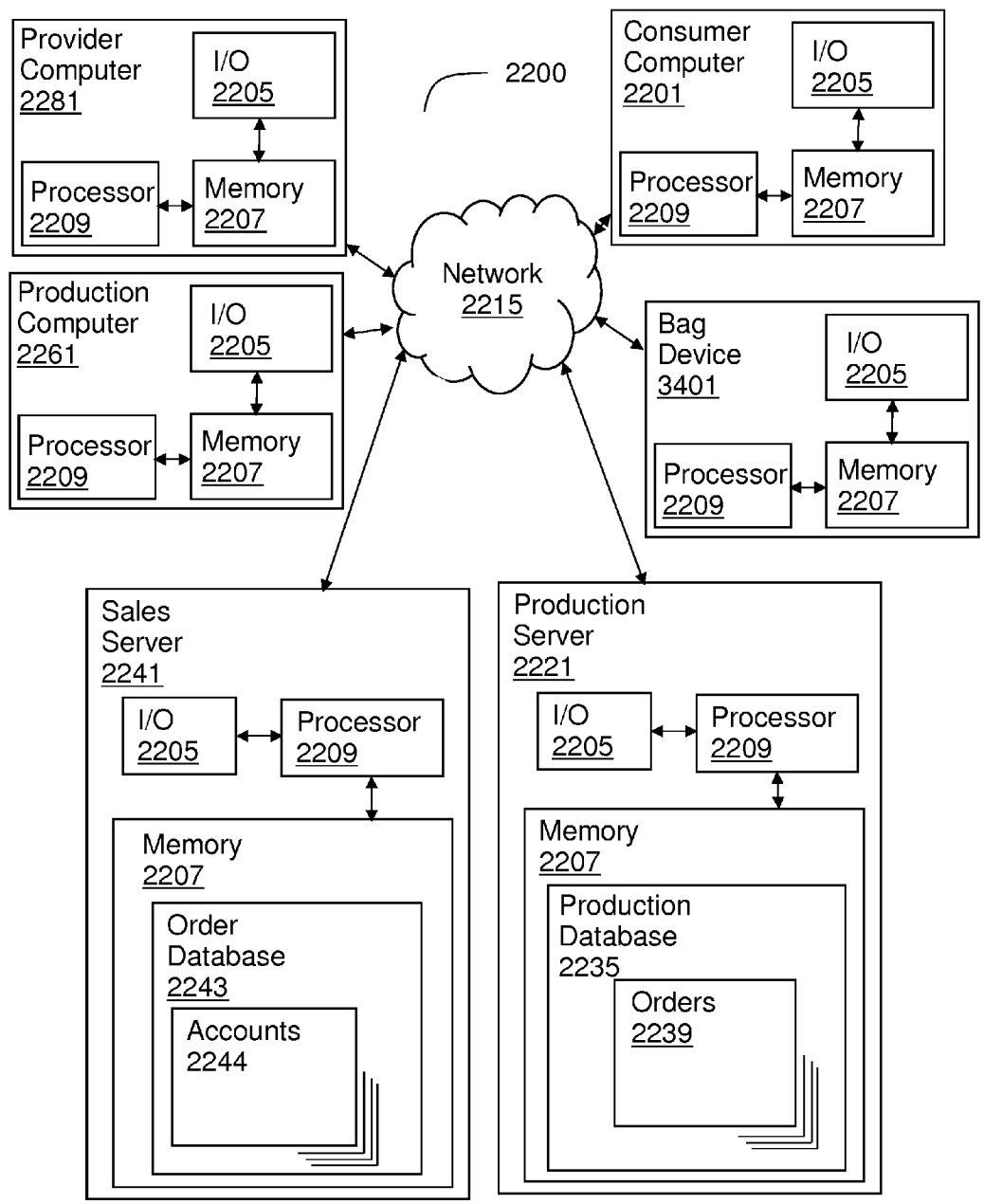
FIG. 22 is a schematic of a custom ordering system.

The invention provides systems suitable for implementing methods of providing a customized golf bag including the foregoing methods. FIG. 22 shows components in an exemplary system for providing a customized golf bag. As shown in FIG. 22, system 2200 generally includes one or more computer, communicably coupled via network 2215. Systems and methods of the invention may generally be implemented through the use of one or more computer such as any combination of a provider computer 2281, a production computer 2261, and a consumer computer 2201 along with, for example, a sales server 2241 and a production server 2221. A computer generally includes a processor (e.g., 2209) operably coupled to a memory (e.g., 2207) and configured to send or receive information via input-output device (e.g., 2205).

One of skill in the art will recognize that a processor may be provided by one or more processors including, for example, one or more of a single core or multi-core processor (e.g., AMD Phenom II X2, Intel Core Duo, AMD Phenom II X4, Intel Core i5, Intel Core i& Extreme Edition 980X, or Intel Xeon E7-2820). In certain embodiments, any of consumer computer 2201, provider computer 2281, production computer 2261 may be a notebook or desktop computer sold by Apple (Cupertino, Calif.) or a desktop, laptop, or similar PC-compatible computer such as a Dell Latitude E6520 PC laptop available from Dell Inc. (Round Rock, Tex.). Such a computer will typically include a suitable operating system such as, for example, Windows 7, Windows 8, Windows XP, all from Microsoft (Redmond, Wash.), OS X from Apple (Cupertino, Calif.), or Ubuntu Linux from Canonical Group Limited (London, UK). In some embodiments, any of consumer computer 2201, provider computer 2281, production computer 2261 may be a tablet or smart-phone form factor device and processor 2281 can be provided by, for example, an ARM-based system-on-a-chip (SoC) processor such as the 1.2 GHz dual-core Exynos SoC processor from Samsung Electronics, (Samsung Town, Seoul, South Korea).

In some embodiments, either of sales server 2241 or production server 2221 can be a Hitachi Compute Blade 500 computer device sold by Hitachi Data Systems (Santa Clara, Calif.). Either of processor 2249 or processor 2229 can be, for example, a E5-2600 processor sold under the trademark Xeon by Intel Corporation (Santa Clara, Calif.).

Input-output devices generally includes one or a combination of monitor, keyboard, mouse, data jack (e.g., Ethernet port, modem jack, HDMI port, mini-HDMI port, USB port), Wi-Fi card, touchscreen (e.g., CRT, LCD, LED, AMOLED, Super AMOLED), pointing device, trackpad, microphone, speaker, light (e.g., LED), or light/image projection device.

In certain embodiments, a consumer's selection of options is received via the consumer's use of consumer computer 2201 and the selection is received at sales server 2241 and stored in memory 2247. Sales server 2241 uses a network card for input/output 2245 to received data. Sales server 2241 maintains order database 2243 which may include accounts 2244 where consumer information is stored (e.g., for payment and delivery information).

After orders are received and ready for production, digital files can be transferred via input/output 2245 from sales server 2241 to production server 2221 via input/output 2225, which may also be a network card or other data transfer mechanism. Order information (e.g., orders 2239) is stored in production database 2235 in memory 2227. Processor 2229 executes computer program instructions stored in memory 2229 to perform order batching and to initiate production.

A production facility may be equipped with a production computer 2261 which either automatically coordinates the operation of machines or provides information to production employees, e.g., via input/output 2265, which could include, for example, a monitor or laser printer.

Many of the steps and functions described herein can be planned or coordinated by a provider personnel using provider computer 2281. For example, engineers or sales personnel can prepare and upload information (e.g., digital files such as in a comma-separated values (CSV) format) that, for example, lists options for features for consumer selection. That is, in certain embodiments, provider personnel use provider computer 2281 to "set up" what options are available, for example, within a display such as the one shown in FIG. 20. Such uploaded information may be saved in memory 2247 on sales server 2241 and can be used, for example, by processor 2249 to cause a display to be rendered such as that shown in FIG. 20 on input/output 2205 on consumer computer 2201. Input/output 2205 can include a monitor displaying a view of a web browser. A customer's selection of options can be stored in one of accounts 2244 in order database 2243 by writing a file in memory 2247.

A memory generally refers to one or more storage devices for storing data or carrying information, e.g., semiconductor, magnetic, magneto-optical disks, or optical disks. Information carriers for a memory suitable for embodying computer program instructions and data include any suitable form of memory that is tangible, non-transitory, non-volatile, or a combination thereof. In certain embodiments, a device of the invention includes a tangible, non-transitory computer readable medium for memory. Exemplary devices for use as memory include semiconductor memory devices, (e.g., EPROM, EEPROM, solid state drive (SSD), and flash memory devices e.g., SD, micro SD, SDXC, SDIO, SDHC cards); magnetic disks, (e.g., internal hard disks or removable disks); magneto-optical disks; and optical disks (e.g., CD and DVD disks). The processor and the memory can be supplemented by, or incorporated in, special purpose logic circuitry.

In some embodiments, a golf bag 101 communicates with device 2201 and can offer beneficial and useful features during a game of golf. For example, a consumer may use device 2201 for shot tracking, scoring, or as a learning aid, and by communicating with club as well as bag 101 may be provided with useful informational services.

Figure 23:
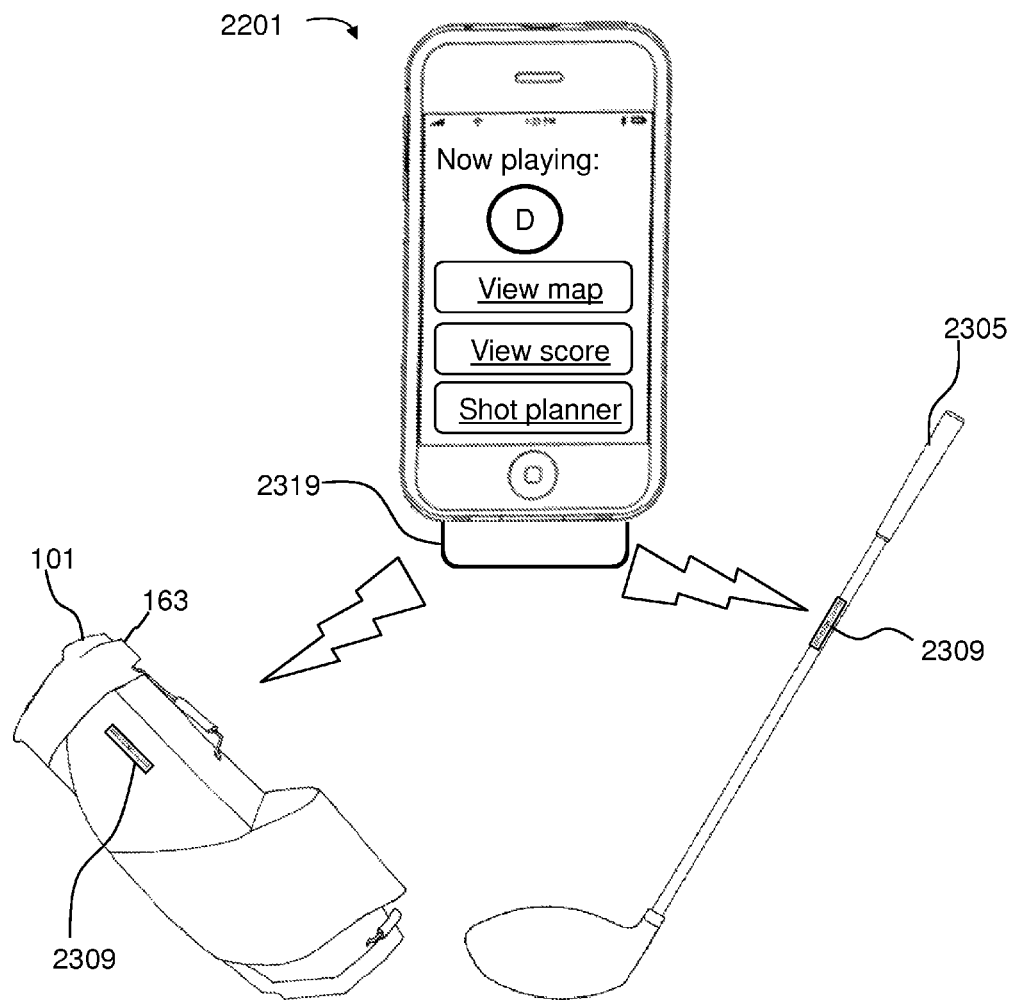
FIG. 23 sketches communication with a golf bag and club.

FIG. 23 depicts electronic communication between bag 101 as well as a club 2305 and a computer device 2201. Here, tag reader 2319 is connected to a mobile electronic device 2201 (e.g., consumer computer 2201 in some embodiments, as depicted in FIG. 22). Tag reader 2319 interrogates the space surrounding it. When a tag 2309 is within the space, it returns a signal. Mobile device 2201 may be a custom device with a unique form-factor or it may be a computer device such as a laptop, tablet computer, or cell phone. In certain embodiments, mobile device 2201 is a smartphone such as the smartphone sold under the trademark GALAXY SIII by Samsung Group (Samsung Town, Seoul, South Korea) or the smartphone sold under the trademark IPHONE by Apple Inc. (Cupertino, Calif.). Card reader 2319 may be the compact flash 6E RFID reader card sold under the trademark SOCKET by Dell Inc. (Austin, Tex.).

Accordingly, the invention provides systems for improving performance or enjoyment of golf including a bag 101 communicatively linked to device 2201 that includes a processor coupled to a tangible, non-transitory memory. Bag 101 can include a communication device 2309 (e.g., Wi-Fi antenna, Bluetooth antenna, RFID tag). The system is operable to analyze data collected by device 2309 about bag 101, its contents, or both. It will further be appreciated that more than one of device 2309 can be used by more than one golfer in concert to develop a social or competitive aspect of the game. For example, where each bag 101 and club 2305 is separately tagged with a device 2309, computing device 2201 can track which club 2305 is out of bag 101 at a time and use that information in shot-tracking. In some embodiments, two golfers can program their systems or devices to display each other's stroke information, shot tracking, present position on a golf course, or other information to each other. They can compare shots, plan their progress through a golf course even when not within earshot of each other, and readily access (e.g., via the internet) data about the course, how pros play, or recommendations about clubs for certain shots. Communicating sports-related information is discussed in SYSTEMS AND METHODS FOR COMMUNICATING SPORTS-RELATED INFORMATION, U.S. Pub. 2012/0316843, the contents of which are hereby incorporated by reference in their entirety. In some embodiments, device 2309 is an RFID tag.

FIG. 24 shows exemplary RFID tags 2309 for use with the invention. An RFID tag provides a wireless non-contact system that uses radio-frequency electromagnetic fields to transfer data from a tag attached to a club, for the purposes of automatic identification and tracking. Some tags require no battery and are powered and read at short ranges via magnetic fields (electromagnetic induction). Others use a local power source and emit radio waves (electromagnetic radiation at radio frequencies). The tag contains electronically stored information which can be read from up to several meters or more away. The tag does not need to be within line of sight of the reader and may be embedded in bag 101. RFID tag 2309 generally includes a microchip 2421 and an antenna 2417. While one of the tags 2309 shown in FIG. 25 is presented as a rectangular and substantially flat tag, RFID tag 2309 can have other shapes and dimensions and can be pre-formed or can be custom fitted into components of the invention.

RFID tag 2309 includes chip 2421 connected to antenna 2417. Embodiments of the invention provide a club bag that includes an RFID tag 2309. In some embodiments, the RFID tag is read by a tag reader 2319 worn or carried on a golfer's body. Reader 2319 may be worn such that the reader interrogates a chipped bag 101 or club 2305 with an EM wave that propagates from the reader 2319 and to bag 101.

FIG. 25 shows a golf club grip 2307 that includes a housing 2509 for an electronic sensing device 2501. In some embodiments, golf bag 101 is provided with one or more of grip 2307 with housing 2509 (e.g., substantially as described in U.S. patent application Ser. No. 13/365,675 filed Feb. 3, 2012) for installation onto a golf club 2305. This provides the benefit that a golfer can install grip 2307 on a club, and include device 2501 on the club, and have that club as well as golf bag 101 both communicate with a computing device 2201. In some embodiments, device 1501 provides more information than an RFID tag 2309 alone such as, for example, position or temperature information, digital files such as text, sound or audio, Wi-Fi communication ability, shot/shock detection (e.g., via a piezoelectric material), positioning by GPS or triangulation to cell towers, or a combination thereof. Device 2501 may optionally include one or any number of RFID tag 2309. Construction and functionality of sensors within device 2501 is discussed in greater detail below with respect to FIG. 28. While shown in FIG. 25 as having a form-factor for insertion into grip 2305, device 2501 can have any form-factor such as, for example, simple box, hockey-puck shape, pliable housing, sewn into fabric, etc. Use of a device 2501 on a golf club 2305 provides such beneficial functions as shot-tracking to improve a player's golf game and additionally, including a device for electronic communication (such as an RFID tag 2309 or a device 2501) on bag 101 provide additional information that allows computing device 2201 to do additional shot-tracking functions (e.g., by being able to identify at what distance bag 101 sits and thus which club 2305 has been removed from bag 101).

Shot tracking may involve a step in which a golfer "trains" device 2201 as to which of tag 2309 or device 2501 is associated with bag 101 and may optionally also train device 2201 as to which tag 2309 or device 2501 is associated with which club 2305.

Figure 26:
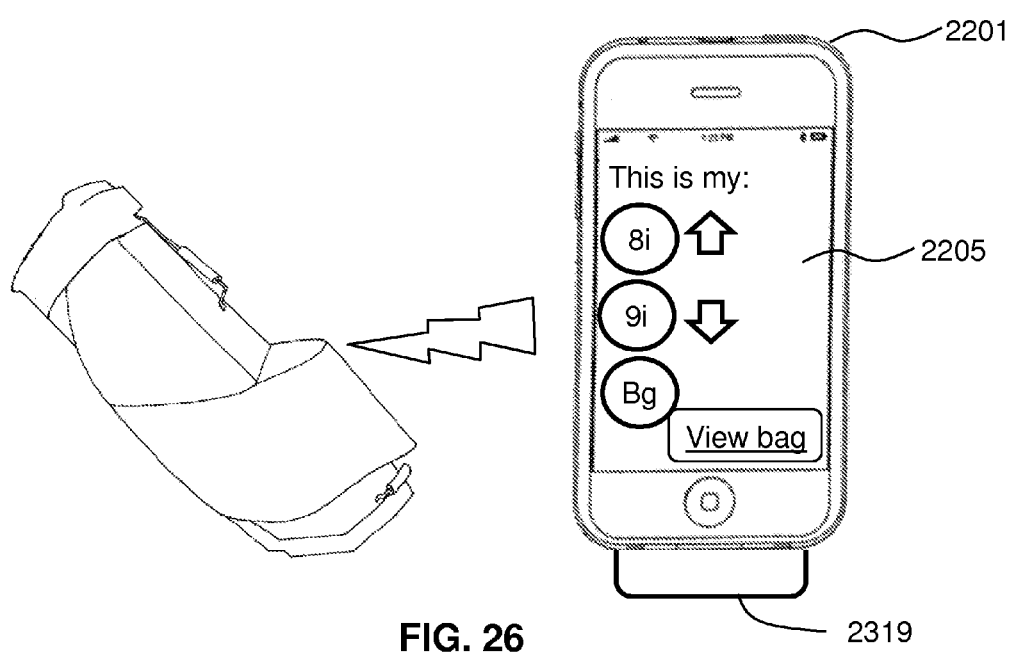
FIG. 26 illustrates registration of a bag.

FIG. 26 depicts a process in which a golfer records his club set into a computer system via use of interface 2205 (which may be, for example, a touch screen of device 2201). Here, golfer has obtained a bag 101 that includes RFID tag 2309. The invention provides a method that includes providing a bag that has a detectable tag; placing the bag in detectable proximity to a computer device including a processor coupled to a tangible, non-transitory memory and coupled to a detector; detecting the detectable tag; presenting, on an interface of the device, a prompt for user input; and receiving input used to create an association between the detectable tag and a digital record of the golf bag. The golfer brings the club near device 2201 which, via tag reader 2319, detects the presence of a uniquely-numbered bag (e.g., the unique number of tag 2309). A program executed by device 2201 prompts the golfer to identify what tag 2309 is associated with. Here, a golfer browses to the button for "Bag". A golfer touches that button on the touch screen to associate the ID of tag 2309 with a computer record for bag 101. Additionally, using functionality provided by device 2201, such as an internal clock, calendar, GPS structure, memory, processor, an internet connection for extrinsic data retrieval (e.g., weather lookup or celebrity golfer score database lookup) or combination thereof, the computer system can record complex multi-dimensional data. Examples of data that can be recorded and stored for later review using methods and systems described herein include: what golfer is using what clubs on what holes on what golf course in what weather; how a golfer's score is improving over weeks or years; how a golfer is performing compared to a ghost opponent; whether a newly-purchased club is associated with an improved playing ability; what loft or face angle is associated with a minimum number of strokes; what club a golfer relies on for specific yardage, etc.

In some embodiments, the invention provides one or more of tag 2309 for bag 101 and clubs as, for example, a set. In certain embodiments, a tag reader 2319 is included in bag 101. For example, a tag reader 2319 may be housed within compartment 163 and coupled to a computing device 3401 also housed therein. Thus where, for example, golf clubs are tagged with tags 2309, bag 101 can—via a computer program within a non-transitory memory 2207 of device 3401—maintain an inventory of those clubs being held by bag 101.

Figure 27:
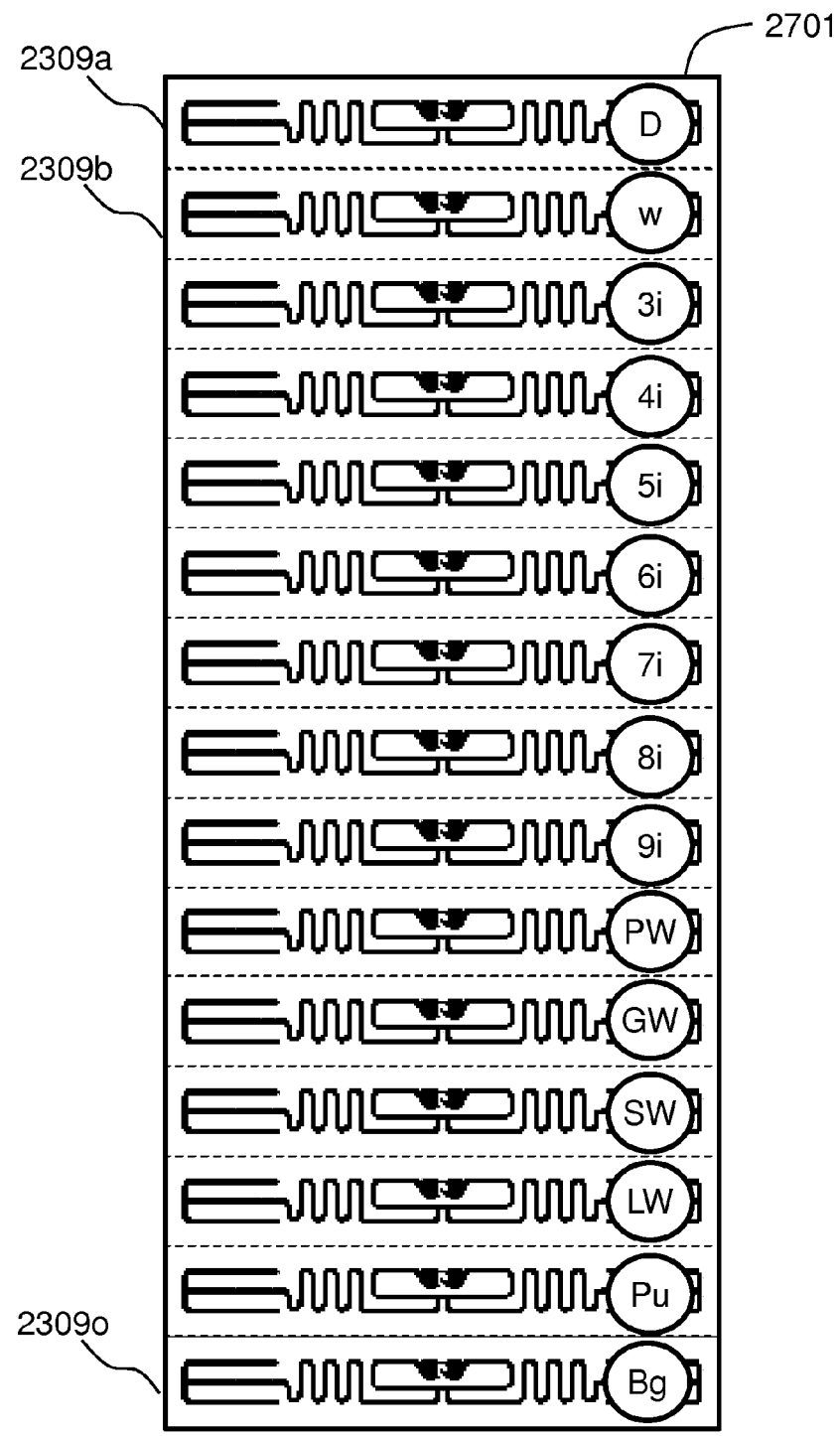
FIG. 27 gives a set of RFID tags.

FIG. 27 depicts a tag set 2701 including a plurality of RFID tag 2309a, 2309b, . . . , 2309o. Here, each tag is provided as a separable portion of a sheet. The tags may be perforated for manual separation. In some aspects, the invention provides a sheet that includes 15 RFID tags. In some embodiments, the sheet consists of 15 RFID tags that are separable from one another by either cutting or tearing along perforations. The tags may each optionally further include a label area that is either blank or pre-printed. In some embodiments, 15 tags are provided within a sheet that is 8.5×11 (i.e., has excess material outside of the tags) or that does not have excess material outside of the tags. The tags can be provided in a format so that a person may load them into a printer and print into label areas. In some embodiments, when a consumer purchases a bag 101, a provider can prepare a set of printed tags for tagging bag 101 and a set of clubs. The tags can be provided to the consumer as, for example, a tool to inform them of the availability of a computer-based system for game improvement.

Using a set such as is shown in FIG. 27, a golfer can achieve beneficial functionality. There is one tag for bag 101 and one for each club of a set. Additionally, tags could encode for one of: club type (e.g., 9 iron, driver, putter, etc.); manufacturer; owner; golf course; user; effective setting; shaft length; opponent; ghost opponent; shoes being worn; weather; subjective mood; or others. In some embodiments, a first tag 2309 is fixed within bag 101 and codes for something unchanging (e.g., the identity of that bag) and a second tag 2309 is removably mounted on bag 101 (e.g., through a temporary adhesive) and codes for something specific to the moment (user, golf course, opponent). This allows a golfer to use a computer based system to collect and make use of complex information.

Using a tagged golf bag 101 and one or more of RFID tag on a club allows advanced functionality. For example, a commercial entity could use one or more RFID tags for tracking inventory. In some embodiments, a nascent bag 101 is tagged early in a fabrication process and tracked throughout the process. This allows very flexible bag customization, because a customer's order can be uniquely identified by number, and as a bag flows through the manufacturing process, an RFID tag reader and computer monitor at each work station can display what step the customized bag requires—e.g., which material, what color, etc. Additionally, the RFID tag on the bag can be used for inventory purposes. As bags flow through the supply chain, the contents of a case or shipment can be confirmed instantly and electronically.

In some embodiments, bag 101 includes systems or devices that provide information about a present state of usage or motion or orientation of the bag.

Figure 28:
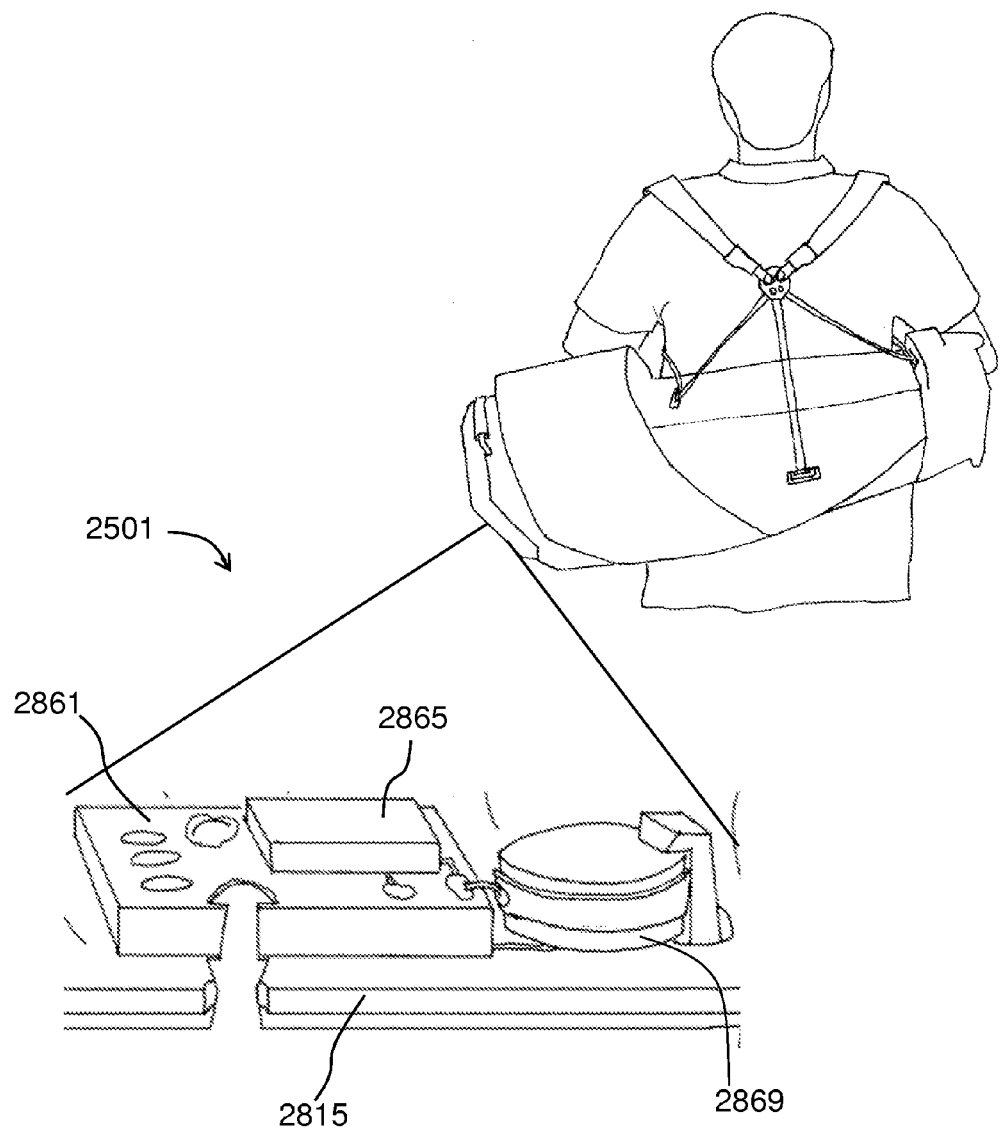
FIG. 28 shows a position motion sensor for a golf bag.

FIG. 28 shows mounting of an electronic sensing device 2501 in a club bag 101. Sensing device 2501 preferably includes a board 2861 for solid state circuitry. Board 2861 may include a spatial sensor 1865 (e.g., a position or motion sensor such as an accelerometer) and may optionally be coupled to a battery 2869. It may be preferred to include an additional layer of a shock-absorbing material 2815. RFID tag 2309 may also be coupled to sensor 2865 (e.g., an accelerometer) mounted on circuit board 2861 in connection with battery 2869. Any suitable accelerometer 2865 may be included. In certain embodiments, accelerometer 2865 is accelerometer model number ADXL 322 or model number ADXL 320 available from SparkFun Electronics (Boulder, Colo.). A device 2501 with motion-sensing capabilities can be used to detect when a club is withdrawn from, or inserted into, bag 101. Thus the invention provides a method of tracking when a golf club is used that includes detecting a characteristic motion of a bag via a motion sensor on the bag; relaying a signal to a computing device indicating that the bag has exhibited the characteristic motion; and recording, in the computing device, a record indicating that a club has been removed from (or inserted into) the bag. The record can include a time of removal of the club, a location of removal of the club (e.g., by reference to a GPS subsystem within the computing device), an identity of the club (e.g., by a detectable tag on the club or by a user input into the device), or other information, such as weather information or information about a golf course (e.g., retrieved from the internet or input by a user). In some embodiments, the method includes a calibration step in which a club is removed from the bag (e.g., at home or within a shop) to generate the characteristic motion and a computer device receives a test signal characterizing the motion; stores the test signal; and receives user input defining the test signal as characterizing the characteristic motion.

One set of insights of the invention is that RFID tags 2309 can provide very desirable functionality for golf tracking and analysis when used in combinations (e.g., with a club 2305 including one or more of RFID tag 2309). Of particular significance, a plurality of clubs 2305 may each have one RFID tag that communicates something about that club, while bag 101 may include one RFID tag 2309 that communicates something in common to the clubs. In one illustrative example, each club can be tagged by type (putter, sand wedge, 9 iron, etc.) while bag 101 is tagged for a given day of golfing (e.g., Toney Pines on June 1). The club-specific tags could be permanent (e.g., adhered to an inside of shaft at manufacture) and the day-specific tags could be temporarily affixed to bag 101.

Using RFID, a device can detect a bag and a club. A bag 101 represents a base station. Also, a club's proximity to bag 101 indicates whether it is presently in use.

Detectors for use in golf are discussed in U.S. Pat. No. 7,311,612; U.S. Pat. No. 6,073,086; U.S. Pub. 2012/0052971; and U.S. Pub. 2011/0028230, the contents of each of which are incorporated by reference. In some embodiments, the invention provides tools for use of more than one device on a golf club even where those devices are not adjacent to one another including, for example, electrical contacts from one device to another.

FIG. 29 shows a bag 101 having a wheeled conveyance 2901 (e.g., such as a skateboard or a scooter platform). Main platform board 2901 is connected to bag 101 via hinge 2909 and thus can be extended down and away from the body of the bag 101 (i.e., so that platform board 2901 extends perpendicularly from bag 101). Additionally, bag 101 may have one or a pair of handles 2919 extending from the body of the bag. With scooter/skateboard platform 2901 deployed so that wheels 2905 (either two wheels, four wheels, or any other number) rest on the ground, bag 101 stand up substantially vertically, with handles 2919 sticking out.

FIG. 30 gives a front view of wheeled conveyance 1901 on golf bag 101. Once board 2901 is deployed, resting on wheels 2905 on the ground, a golfer may stand on the scooter/skateboard, grasp handles 2919, and kick propel themselves forward, giving themselves an easy way to return their golf clubs to their car after a long day playing golf.

Figure 31:
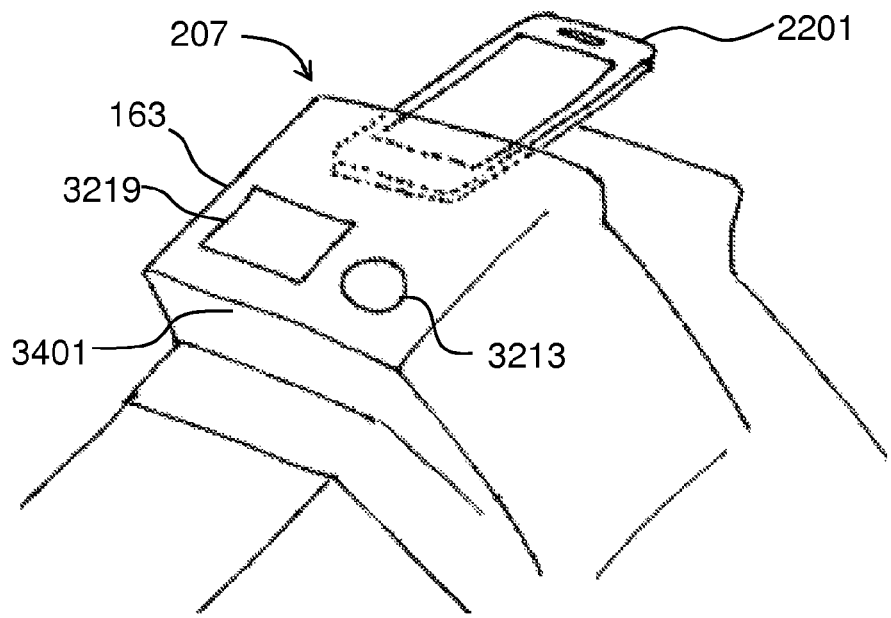
FIG. 31 shows docking station for an electronic device on golf bag.

FIG. 31 shows docking station 207 for an electronic device 2201 on golf bag 101 according to certain embodiments. Docking station 207 may be generally housed within compartment 163 to protect device 2201 and mechanical components of docking station 207. Docking station 207 provides an interface 2205 to electronic device 3401 that may be provided within golf bag 101. Details of device 3401 are given below and it may include, as I/O 2205, one or more of docking station 207 and/or its connector 3300; screen 3219; speaker 3213; others, or a combination thereof.

Figure 32:
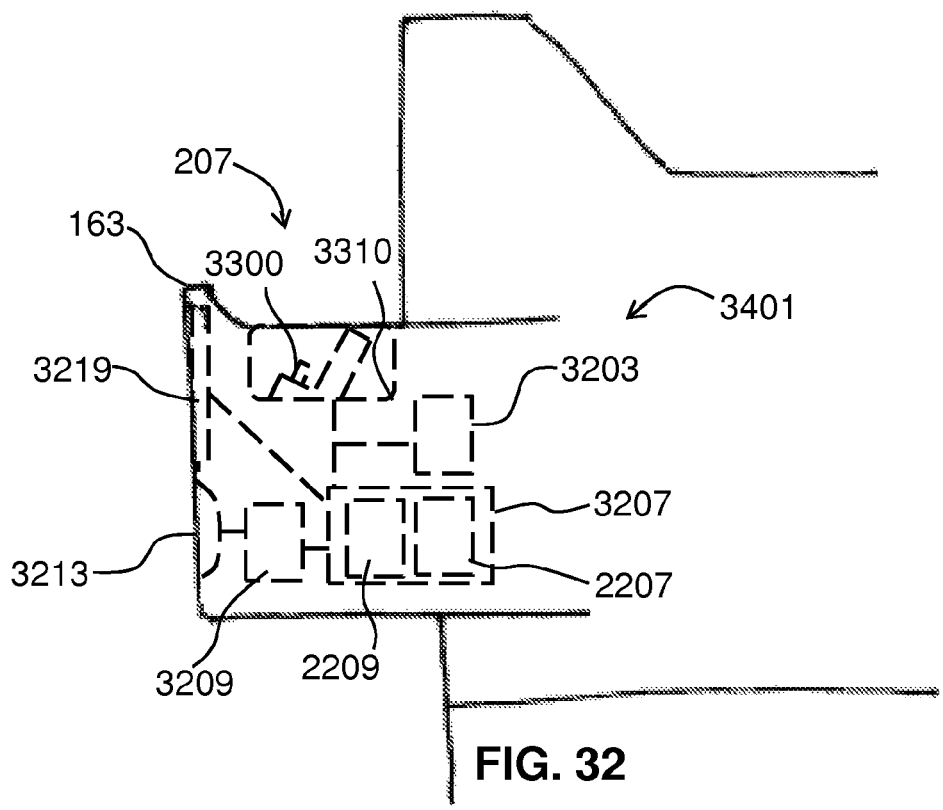
FIG. 32 gives a side view of a docking station.

FIG. 32 gives a side view of docking station 207 and illustrates an electronic device 3401 housed therein. Bag electronic device 3401 preferably includes a non-transitory memory 2207 coupled to a processor 2209 and either or both may be mounted on a circuit board 3207. Device 3401 may include a battery 3203 (e.g., a rechargeable battery optionally coupled to an optional photovoltaic cell on an exterior surface of bag 101). The depicted embodiment includes the optional features of an amplifier 3209, a speaker 3213, and a screen 3219 (e.g., a capacitance touch screen for I/O 2205). Board 3207 in communicatively coupled to device 2201 via connector 3300 (preferably a universal connector for receiving any typical smartphone or tablet). Connector 330 is supported by a base member 3310 physically housed and structurally supported by elements of bag 101. An insight included in the invention is that a benefit may be provided by including a processor 2209 coupled to a non-transitory memory 2207 as part of a golf bag 101. A golf bag is natural place where a golfer stands and where golfers congregate during a round of golf. A computing device 3401 can provide valuable information such as score-keeping functions, club-selection advice, weather information, and business contacts and updates (e-mails, for example). Thus it is believed that including a computer device with a processor coupled to a memory in a golf bag may provide great benefits to consumers. A further particular insight of the invention is the value and benefit of including a connector 3300 in a golf bag 101 (e.g., as part of a docking station 207). Many golfers keep some information and mobile applications of primary importance on their personal device 2201. A golf bag is a beneficial place to provide supplemental devices such as a re-charger, an amplifier and speaker, additional data, processing power, others, or a combination thereof. The union of benefits provided by a mobile device 2201 and on-bag electronics 3401 may best be realized by connecting those systems via connector 3300, as illustrated in FIGS. 31 & 32.

Figure 33:
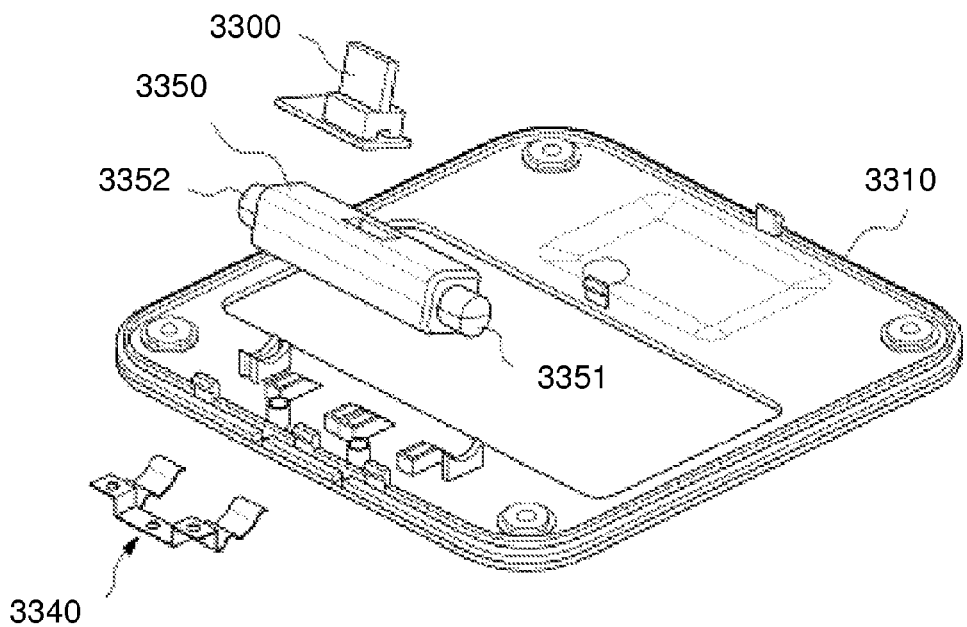
FIG. 33 shows components supporting a connector.

FIG. 33 gives an exploded view of components supporting connector 3300 on base member 3310 within dock 207. Connector 3300 is fixed to the housing 3350, and the hinges of the housing are positioned on the support of the base, with the elastic body 3340 mounted between the housing and the base. The fixed ends of the elastic body are fixed by fasteners (not shown). The connector 300, which is a universal connector, is received in the base 3310 and mounted so as to rotate. Housing 3350 is adapted to receive the connector 3300 and rotate it inside the base, and has hinges 3351 and 3352 on both lateral ends, respectively. The housing 3350 is supported by an elastic body 3340, which exerts force so as to return the housing 3350 to its initial position. Housing 3350, mounted on connector 3300, rotates and is biased upwards when empty for ease of insertion of device 221. When the elastic body 3340 is mounted on the base 3310, the left and ends remain forced against the outer surface of the housing 3350, specifically its bottom surface, and support the housing 3350 in the upright position. When an external force acts on the housing 3350, for example, when a mobile phone connects to the connector 3300 and rotates due to its own weight, the left and right free ends move approximately downwards and remain forced against a predetermined area of the bottom surface of the housing 3350, thereby supporting the rotated housing 3350. When the mobile phone is disconnected from the connector 3300, the elastic body 3340 returns the housing 3350 to its initial position. A connection mechanism for dock 207 suitable for modification for use with the invention is shown in U.S. Pub. 2013/0217448 to Kim, incorporated by reference.

Figure 34:
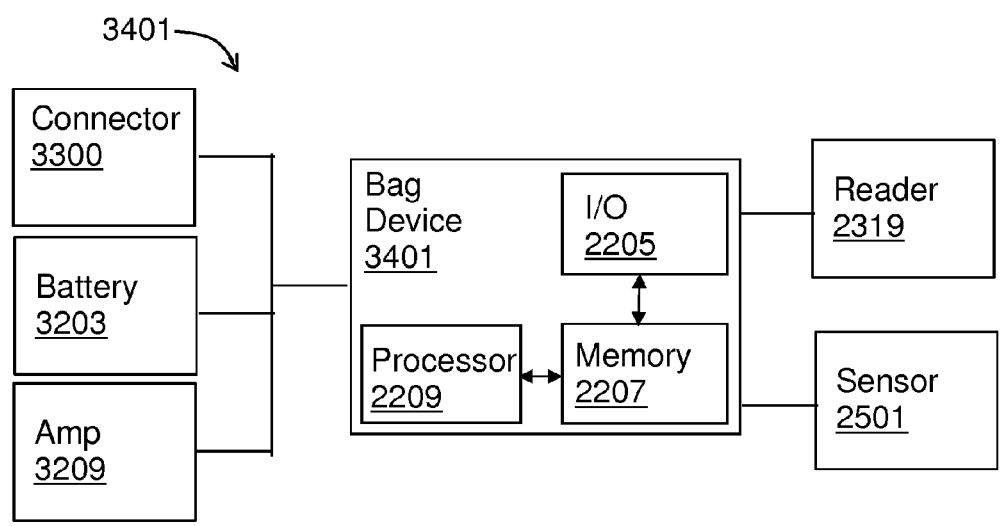
FIG. 34 gives a schematic of a computing device on a golf bag.

FIG. 34 gives a schematic of bag device 3401. Each depicted component is optional. Device 3401 provides processor 2209 operably coupled to non-transitory memory 2207 and I/O device 2205. I/O device 2205 can include one or a number of devices that may include connector 3300, speaker 3213, and a screen 3219. It may be beneficial to include battery 3203, amplifier 3209, spatial sensor 2501, tag reader 2319, others, or a combination thereof. Tag reader 2319 may be an RFID tag reader. Spatial sensor 2501 may include an accelerometer. By these means, a golfer may dock a smartphone or other mobile device on bag 101 during play. The docked smartphone 2201 can then recharge via battery 3203, a photovoltaic cell, or other such mechanism. Meanwhile, the golfer can use a mobile app on device 2201 to aid in club selection. Mobile apps suitable for execution by device 2201, device 3401, or both are discussed in SYSTEM AND METHOD FOR FITTING GOLF CLUBS AND SETS, U.S. patent application Ser. No. 14/160,019, filed Jan. 21, 2014, and in U.S. Pub. 2012/0316843, both incorporated by reference.

As used herein, the word "or" means "and or or", sometimes seen or referred to as "and/or", unless indicated otherwise.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A golf bag comprising:
    an extended body having a closed end, an open end, a top surface area, a bottom surface area, a right side surface area, and a left side surface area; and
    a computing device comprising a non-transitory memory configured to store data related to a game of golf and a processor configured to provide, via an output device, information related to improving golfer performance during the game of golf, wherein the computing device is operable to
        detect a characteristic motion of a bag via a motion sensor on the bag,
        relay a signal to a computing device indicating that the bag has exhibited the characteristic motion, and
        record—in the non-transitory memory—a record indicating that a club has been removed from or inserted into the bag; and
    a docking station for connecting to a portable electronic device, the docking station configured to transfer the data between the non-transitory memory and the portable electronic device.

2. The golf bag of claim 1, further comprising a touch screen coupled to the computing device and accessible on an external surface of the golf bag.

3. The golf bag of claim 1, further comprising an energy-harvesting device configured to provide an electric charge via the connector to any mobile device connected thereto.

4. The golf bag of claim 3, wherein the energy-harvesting device comprises a photovoltaic cell.

5. The golf bag of claim 4, further comprising a battery configured to store the electric charge.

6. The golf bag of claim 1, further comprising computer program instructions stored in the non-transitory memory that, when executed by the processor, cause the input/output device to provide golf-related information.

7. A golf bag comprising:
    an extended body having a closed end, an open end, a top surface area, a bottom surface area, a right side surface area, and a left side surface area; and
    a computing device comprising a non-transitory memory configured to store data related to a game of golf and a processor coupled to the non-transitory memory, the processor configured to provide, via an output device, information related to improving golfer performance during the game of golf, wherein the computing device is operable to
        detect a characteristic motion of a bag via a motion sensor on the bag,
        relay a signal to a computing device indicating that the bag has exhibited the characteristic motion, and
        record—in the non-transitory memory—a record indicating that a club has been removed from or inserted into the bag;
    a docking station for connecting to a portable electronic device, the docking station configured to transfer the data between the non-transitory memory and the portable electronic device; and
    at least one input/output device.

8. The golf bag of claim 7, further comprising computer program instructions stored in the non-transitory memory that, when executed by the processor, cause the input/output device to provide golf-related information.

9. The golf bag of claim 7, further comprising an accelerometer coupled to the computing device.

10. The golf bag of claim 7, further comprising a GPS subsystem in the computing device.

11. The golf bag of claim 7, further comprising an RFID tag reader coupled to the computing device.

12. A golf bag comprising:
    an extended body having a closed end, an open end, a top surface area, a bottom surface area, a right side surface area, and a left side surface area;
    a computing device comprising a non-transitory memory configured to store data related to a game of golf and a processor configured to provide, via an output device, information related to improving golfer performance during the game of golf, wherein the computing device is operable to
        detect a characteristic motion of a bag via a motion sensor on the bag,
        relay a signal to a computing device indicating that the bag has exhibited the characteristic motion, and
        record—in the non-transitory memory—a record indicating that a club has been removed from or inserted into the bag;
    a docking station for connecting to a portable electronic device, the docking station configured to transfer the data between the non-transitory memory and the portable electronic device; and
    an energy collection device.

13. The golf bag of claim 12, wherein the energy collection device comprises a photovoltaic cell.

14. The golf bag of claim 12, wherein the energy collection device comprises a reverse electrowetting electricity generator.

* * * * *